US012785544B2

(12) United States Patent
Krabbenborg

(10) Patent No.: US 12,785,544 B2
(45) Date of Patent: Nov. 3, 2026

(54) CURRENT LIMIT CONTROL CIRCUIT FOR BOOST CONVERTER IN CCM

(71) Applicant: GOODIX TECHNOLOGY (HK) COMPANY LIMITED, Hong Kong (CN)

(72) Inventor: Bernardus Henricus Krabbenborg, Nijmegen (NL)

(73) Assignee: GOODIX TECHNOLOGY (HK) COMPANY LIMITED, Hong Kong (CN)

( * ) Notice: Subject to any disclaimer, the term of this patent is extended or adjusted under 35 U.S.C. 154(b) by 212 days.

(21) Appl. No.: 18/646,414

(22) Filed: Apr. 25, 2024

(65) Prior Publication Data

US 2024/0313638 A1 Sep. 19, 2024

Related U.S. Application Data

(63) Continuation of application No. PCT/CN2022/137636, filed on Dec. 8, 2022.

(30) Foreign Application Priority Data

Jan. 14, 2022 (EP) .................................... 22151658

(51) Int. Cl.

*H02M 3/158* (2006.01)
*H02M 1/15* (2006.01)
*H02M 1/32* (2007.01)

(52) U.S. Cl.

CPC ............... *H02M 1/32* (2013.01); *H02M 1/15* (2013.01); *H02M 3/158* (2013.01)

(58) Field of Classification Search

CPC .................. H02M 3/155-1588; H02M 1/4225
See application file for complete search history.

(56) References Cited

U.S. PATENT DOCUMENTS 6,768,655 B1 * 7/2004 Yang .................. H02M 1/4225 363/21.01
9,325,243 B2 4/2016 Jayaraj et al.
(Continued)

FOREIGN PATENT DOCUMENTS

CN 103036429 A 4/2013
CN 104319998 A 1/2015
(Continued)

OTHER PUBLICATIONS

Gasparri Osvaldo et al, "DC-DC Buck Converter Driver with Variable Off-Time Peak Current Mode Control", Advances in Science, Technology and Engineering Systems Journal, (Jan. 1, 2020), vol. 5, No. 6, doi:10.25046/aj050642, ISSN 2415-6698, pp. 347-352.

(Continued)

*Primary Examiner* — Peter M Novak
(74) *Attorney, Agent, or Firm* — Scully, Scott, Murphy & Presser, P.C.

(57) ABSTRACT

A control circuit for a boost converter is provided. The control circuit includes switching means configured to switch the boost converter to perform cycles. Each cycle includes an energy charging state, in which an inductor stores energy provided by an input voltage, and an energy discharging state, in which the inductor provides energy to an output of the boost converter. The control circuit further includes comparison means configured to decide whether a current at the inductor is higher than a predetermined maximum current. The control circuit further includes off-time signal generation means configured to generate an off-time signal based on whether the current at the inductor is higher than a predetermined maximum current. The off-time signal determines a duration of a discharging state of a next switching event and the switching means is (Continued)

configured to switch the boost converter based on the generated off-time signal.

16 Claims, 25 Drawing Sheets

(56) References Cited

U.S. PATENT DOCUMENTS

| | | | | |
|---|---|---|---|---|
| 10,432,087 | B2 | 10/2019 | Krabbenborg | |
| 10,476,387 | B1 | 11/2019 | Xi et al. | |
| 2010/0066311 | A1* | 3/2010 | Bao | H02J 7/0071 320/162 |
| 2014/0347028 | A1 | 11/2014 | Jayaraj et al. | |
| 2017/0126129 | A1 | 5/2017 | Li | |
| 2019/0089245 | A1* | 3/2019 | King | G05F 1/46 |
| 2019/0131871 | A1* | 5/2019 | Krabbenborg | G05F 1/10 |
| 2019/0140542 | A1* | 5/2019 | Luff | H02M 3/1582 |
| 2020/0021188 | A1 | 1/2020 | Xi et al. | |
| 2020/0161977 | A1 | 5/2020 | Yang et al. | |
| 2021/0242774 | A1 | 8/2021 | Yun et al. | |
| 2021/0359605 | A1 | 11/2021 | Yang et al. | |

FOREIGN PATENT DOCUMENTS

| | | | |
|---|---|---|---|
| CN | 105305798 | A | 2/2016 |
| CN | 109756111 | A | 5/2019 |
| CN | 111033992 | A | 4/2020 |
| CN | 111277140 | A | 6/2020 |
| CN | 112953219 | A | 6/2021 |
| CN | 113271011 | A | 8/2021 |
| CN | 115441701 | A | 12/2022 |
| EP | 2775599 | B1 | 9/2018 |
| WO | 2016044487 | A1 | 3/2016 |

OTHER PUBLICATIONS

M. Berkhout, “Integrated overcurrent protection system for class-D audio power amplifiers,” in IEEE Journal of Solid- State Circuits, vol. 40, No. 11, pp. 2237-2245, Nov. 2005.

TFA9878, High Efficiency Class-D Audio Amplifier, dataheet, Goodix Technologies.

Xiaoru Xu, Xiaobo Wu and Xiaolang Yan, “A quasi fixed frequency constant on time controlled boost converter,” 2008 IEEE International Symposium on Circuits and Systems (ISCAS), Seattle, WA, USA, 2008, pp. 2206-2209, doi: 10.1109/ISCAS.2008.4541890.

International Search Report dated Mar. 6, 2023 issued in PCT/CN2022/137636.

* cited by examiner

CURRENT LIMIT CONTROL CIRCUIT FOR BOOST CONVERTER IN CCM

CROSS-REFERENCE TO RELATED APPLICATIONS

This application is a continuation of PCT International Application No. PCT/CN2022/137636, filed on Dec. 8, 2022, which claims priority to EPO Patent Application No. 22/151,658.6, entitled "Current limit control circuit for a boost converter in CCM" and filed on Jan. 14, 2022. The disclosures of each of the aforementioned applications are hereby incorporated by reference in their entireties for all purposes.

TECHNICAL FIELD

The disclosure relates to a control circuit to limit the input current for a boost converter circuit. The disclosure further relates to a boost converter circuit comprising said control circuit and to a method of operating said boost converter circuit comprising said control circuit.

BACKGROUND

Energy harvesting is the process by which energy is derived from external sources, captured, and stored for small, wireless autonomous devices, like those used in wearable electronics and wireless sensor networks. A direct current to direct current 'DC-to-DC' converter circuits, such as boost converter circuits, are electronic circuits that convert a source of direct current (DC) from one voltage level to another voltage by first charging an energy storage element using an input voltage and then discharging the energy storage element to provide the energy at the output of the DC-to-DC converter. DC-to-DC converters can be used to increase the amount of energy harvested from an energy source. Constant-On-Time (COT) boost converters are popular for its simplicity and high performance.

When working in continuous conduction mode, a battery (and the PCB wiring to the battery) gives an impedance in series with a coil of the boost converter. This impedance usually has an inductive character so that the coil current ripple can cause a high voltage variation at the battery voltage connection of the coil on the PCB. Since also other applications may be connected at that point, it is usually decoupled to ground with a capacitor and thus creating a low pass filter between battery and coil. To avoid excessive currents in the coil, a current protection is usually implemented.

"Integrated overcurrent protection system for class-D audio power amplifiers", by M. Berkhout, IEEE Journal of Solid-State Circuits, Volume: 40, Issue 11, November 2005, discloses a power stage that contains switches for switching inductive loads and provides current protection by measuring the current in the inductor and controlling the switches when the maximum current is detected. This overcurrent protection will nicely limit the maximum current. However, the period of time that the boost is charging, i.e., the duration of the phase where the current through the inductor is increased, now deviates from the intended value and the intended boost voltage can no longer be maintained as a natural result of the current limit action. The inductor current during this limiting action has unpredictable low frequency patterns with high amplitude. The voltage on the battery decoupling capacitor is also affected by this current limiting behavior. Filtering with a capacitor at the input of the boost converter is not very effective for these current patterns and lead to low frequency high amplitude voltage variations at the battery voltage that disturb the operation of the boost converter and other applications connected to this node. Furthermore, this solution prevents accurate battery current limiter control since there is no clear relation between battery current and peak coil current. The average current during the unpredictable switching behavior is lower than in case of regular switching. This limits the input power earlier than in case of regular switching.

SUMMARY

An object of the disclosure is to implement control means to limit current for a boost converter such that the switching frequency is stable and the low frequency, high amplitude variations in the inductor during current limiting are avoided. By avoiding high amplitude variations in the inductor, the average current can be higher than in prior art solutions.

According to the disclosure, there is provided a control circuit for a boost converter wherein the control circuit comprises switching means configured to switch the boost converter to perform cycles wherein each cycle comprises an energy charging state in which an inductor stores energy provided by an input voltage and an energy discharging state in which the inductor provides energy to an output of the boost converter, comparison means configured to decide whether a current at the inductor is higher than a predetermined maximum current and off-time signal generation means configured to generate an off-time signal based on whether the current at the inductor is higher than a predetermined maximum current, wherein the off-time signal determines a duration of a discharging state of a next switching event and wherein the switching means is configured to switch the boost converter based on the generated off-time signal. This allows to implement a current limiter in a constant on time boost converter that allows coil current limitation while switching at the same frequency as without coil current limiting action, and that does not disturb the filtered battery voltage when current limiting. The current limiting options in the constant-on-time boost converter as described are comparable with those in a fixed frequency peak current mode controlled boost converter, but with a much simpler implementation. Usually, a boost converter behaves more or less as a voltage source where the output current, and thus the coil current, depends on the load. When the coil current reaches the maximum value however, it should behave as a current source where the boost voltage varies with the load and the coil current or battery current is limited to a (programmable) maximum value. A comparison with a DC power supply can be made here. The move to a current controlled converter can be done by changing the constant-on-time control to a constant-off-time (i.e., a constant duration of the energy discharging state) control in case of current limiting. During the constant-on-time control, the energy charging state has a constant duration, while during the constant-off-time control, the energy discharging state is the one having a constant duration. The start of the off-period (i.e., the energy discharging state) is already generated by the peak current limiter when $I_{COIL}=I_{MAX}$ and the overcurrent signal oc is produced. The off-time (i.e. energy discharging state) required to have a stable switching frequency can be generated similar to the generation of the on-time in case of constant-on-time control (when there is no current limiting).

In an example of the present disclosure, the off-time signal determines the duration of the discharging state $T_{OFF}$ based on the input voltage $V_{BAT}$, a switching frequency $f_{TARGET}$ at which the boost converter performs cycles and an output voltage $V_{BST}$ at the output of the boost converter such that:

$$T_{OFF} = \frac{V_{BAT}}{f_{TARGET} V_{BST}}.$$

By providing a constant duration of the energy discharging state, the switching frequency of the boost converter circuit can be controlled.

In an example of the present disclosure, the switching means are configured to switch the boost converter between a first current operation mode and a second voltage operation mode based on whether a current at the inductor is higher than a predetermined maximum current.

In an example of the present disclosure, the off-time signal generation means comprises a capacitor and a comparison circuit wherein the capacitor is configured to store a voltage, wherein the comparison circuit comprises a first input, a second input, wherein the comparison circuit is configured to receive a reference voltage at the first input, to receive the stored voltage at the second input, and to generate the off-time signal by comparing the reference voltage and the stored voltage. This is a very efficient way of implementing the off-time signal generation means.

In an example of the present disclosure, the on-time signal generation means comprising another capacitor and another comparison circuit wherein the another capacitor is configured to store another voltage, wherein the another comparison circuit comprises a first input, a second input, wherein the another comparison circuit is configured to receive another reference voltage at the first input, to receive the stored voltage at the second input, and to generate an on-time signal by comparing the another reference voltage and the stored voltage. This is a very efficient way of implementing the on-time signal generation means. Alternatively, the same circuit may be used for the off and on time signal generation means wherein the reference voltage is generated by a controllable voltage source that can be controlled to provide the voltage corresponding to the current limitation or to the voltage limitation operation modes depending on the operation mode of the boost converter circuit.

In an example of the present disclosure, the comparison means is further configured to receive the output voltage of the boost converter circuit, a minimum voltage and to decide whether the output voltage is higher than the minimum voltage; and the on-time signal generation means configured to generate the on-time signal based on whether the output voltage is higher than the minimum voltage.

In an example of the present disclosure, the maximum current is $$I_{BAT,MAX} + D\frac{V_{BAT}}{2L_{BST} f_{BST}};$$

wherein $I_{BAT,MAX}$ is a maximum current for a battery connected at the input of the boost converter circuit, $V_{BST}$ is the output voltage, $V_{BAT}$ is the input voltage, $L_{BST}$ is the inductance value of the inductor and $$D = \frac{V_{BST} - V_{BAT}}{V_{BST}}$$

is the duty cycle of the switch connecting the inductor to ground. This allows battery current limitation since an appropriate compensation current can be generated based on the predictable switching frequency during current limiting. In this way, accurate battery current limiter control can be provided.

According to the disclosure, there is further provided a boost converter circuit comprising the control circuit, an inductor, an input terminal configured to receive an input voltage and an output terminal configured to provide an output voltage and a method to operate said boost converter circuit.

The person skilled in the art will understand that the features described above may be combined in any way deemed useful. Moreover, modifications and variations described in respect of the system may likewise be applied to a method of operating the boost converter circuit.

BRIEF DESCRIPTION OF DRAWINGS

In the following, aspects of the disclosure will be elucidated by means of examples, with reference to the drawings. The drawings are diagrammatic and are not drawn to scale.

DESCRIPTION OF EMBODIMENTS

In the figures, the same reference numbers indicate elements that are similar in structure and function.

Figure 1A:
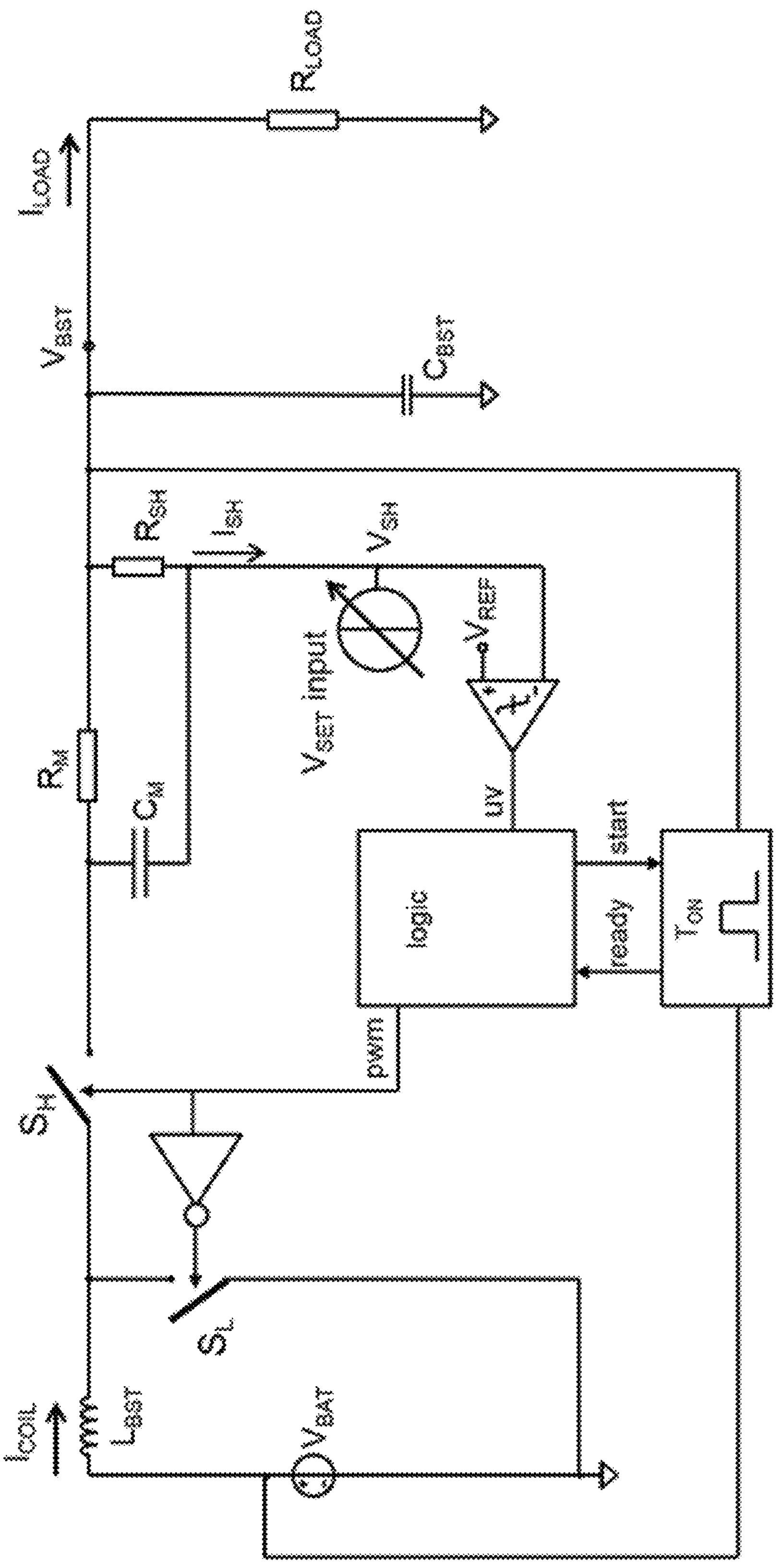
FIGS. 1A-1V show schematics of circuits for a boost converter and corresponding waveforms diagrams.
Figure 1B:
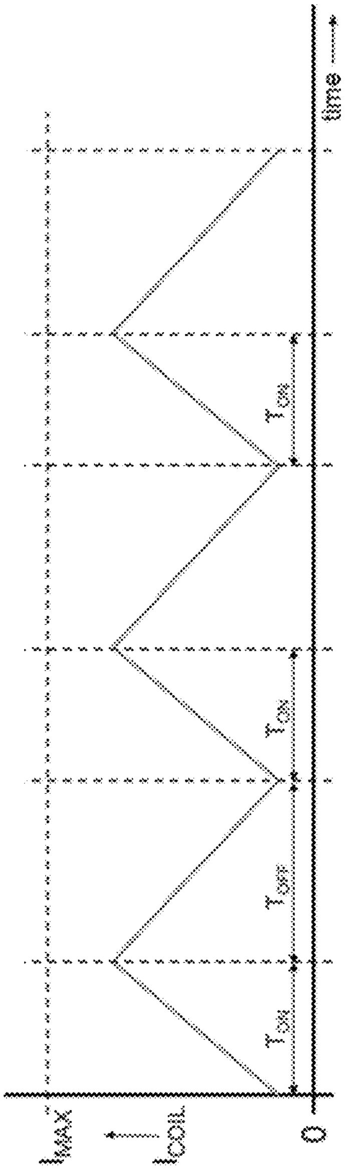
Figure 1C:
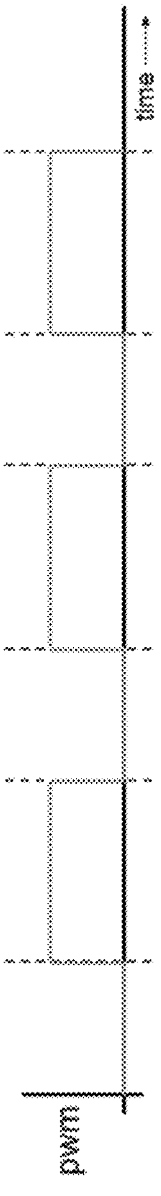
Figure 1D:
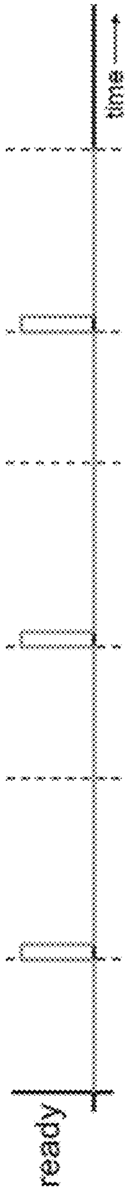
Figure 1E:
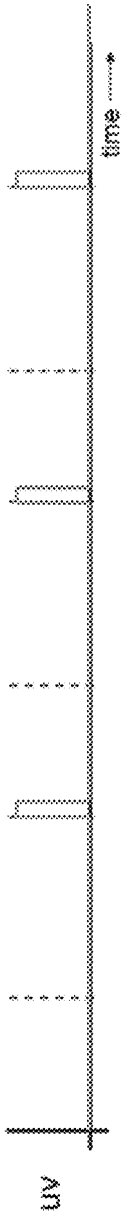

A Constant-On-Time (COT) boost converter is popular for its simplicity and high performance in both continuous conduction mode (CCM) and discontinuous conduction mode (DCM). An example of a COT boost converter topology is shown in FIG. 1A. A minimum voltage $V_{BST,TARGET}$ (i.e., a desired voltage at the output of the boost converter) is set by choosing the appropriate value for $I_{SH}$ using the adjustable current source of FIG. 1A.

$$I_{SH} = \frac{V_{BST,TARGET} - V_{REF}}{R_{SH}}.$$

In contrast with what the name of this DC-DC converter topology suggests, the on-time is usually chosen to depend on $V_{BAT}$ and $V_{BST}$ in such a way that the target switching frequency $f_{TARGET}$ in CCM is reached independent of $V_{BAT}$ and $V_{BST}$.

$$T_{ON} = \frac{V_{BST} - V_{BAT}}{f_{TARGET} V_{BST}}.$$

During operation the on-time is started as soon as the output boost voltage $V_{BST}$ drops below the minimum voltage $V_{BST,TARGET}$ and the under voltage signal uv goes high. As a response to that signal, pwm goes low so that $S_L$ is closed and $S_H$ is opened and the current through coil $L_{BST}$ will increase. At the same time, start goes high, and the timer is started. When the on-time is reached, the timer generates a ready signal. This signal will cause pwm high so that $S_L$ is opened and $S_H$ is closed and the current through coil $L_{BST}$ will decrease while charging the output capacitor $C_{BST}$. As a result, uv will go low and as soon as the boost voltage has dropped below the minimum voltage again, the process repeats. The typical waveforms of $I_{COIL}$ and pwm during a constant load are illustrated in FIGS. 1B-1E.

Figure 1F:
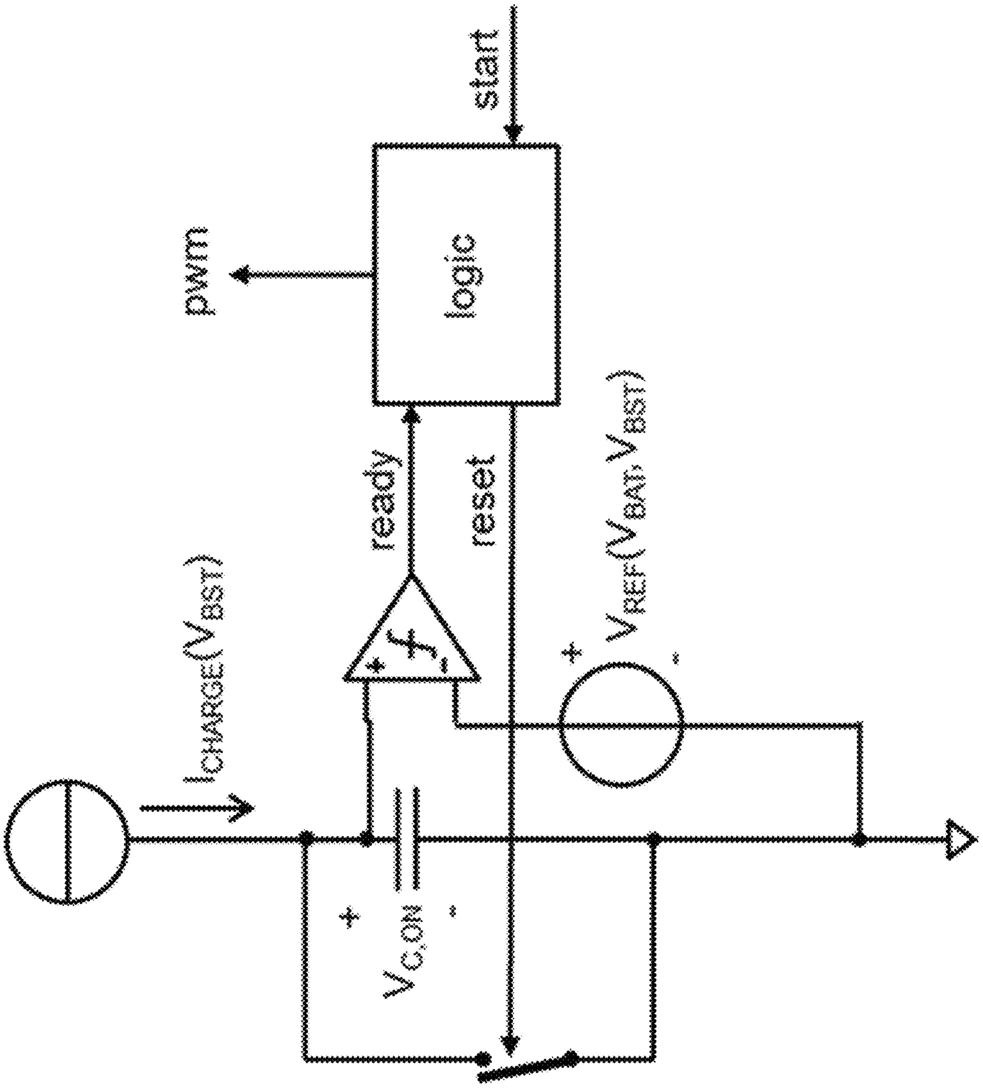
Figures 1G, 1H, 1I, 1J:
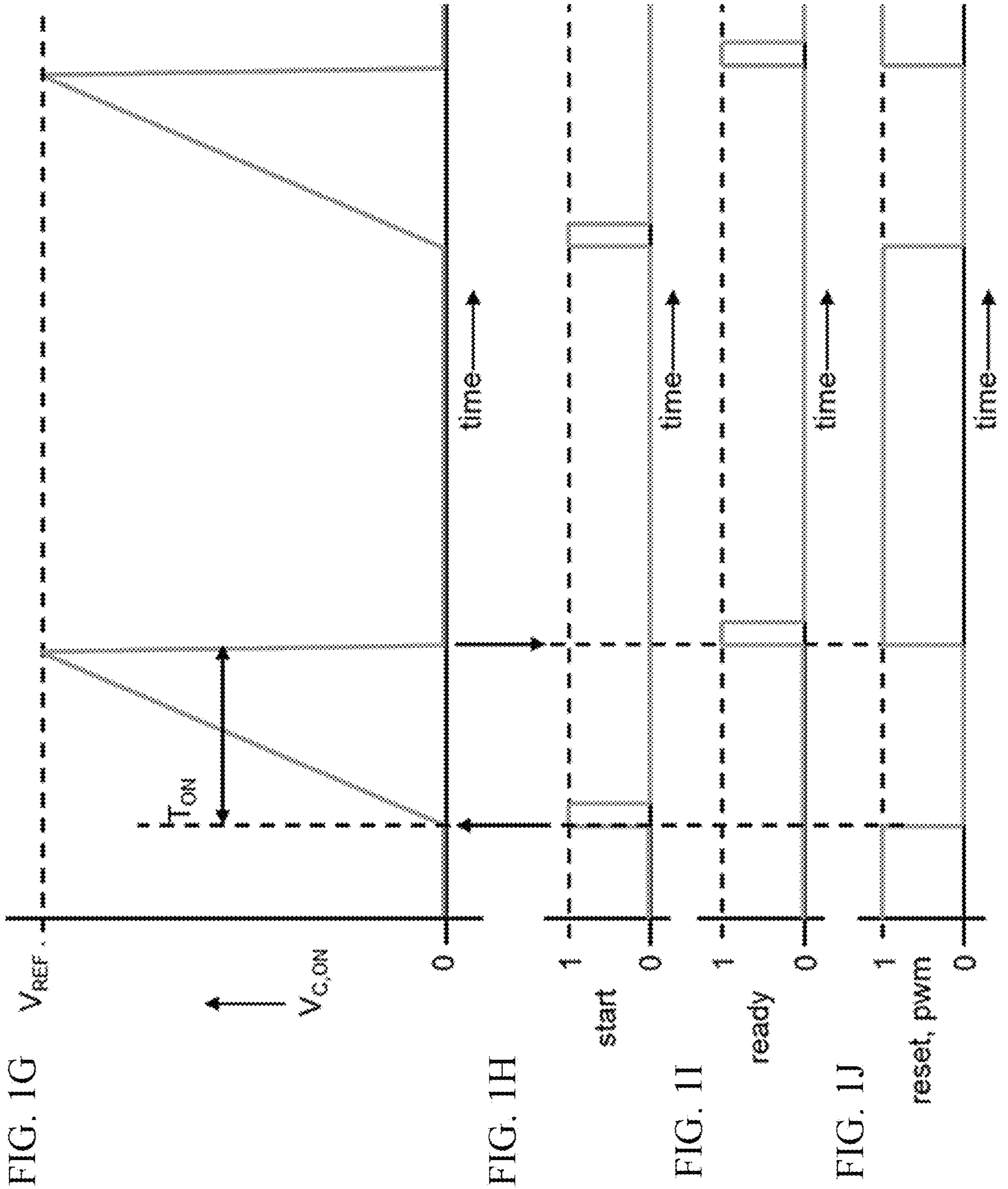

A method to generate $T_{ON}$ using a current source and a capacitor can be seen in FIG. 1F. Note that $I_{CHARGE}$ is proportional to $V_{BST}$ and $V_{REF}$ is proportional to $V_{BST}$-$V_{BAT}$ to obtain the required target frequency in continuous conduction mode (CCM). When start goes high, reset goes low and $V_{C,ON}$ increases linearly with time until $V_{REF}$ is reached. The comparator generates a ready signal that resets $V_{C,ON}$ to 0. The logic is used to drive the switches $S_H$ and $S_L$. This is shown in FIGS. 1G-1J.

A battery (and the PCB wiring to the battery) gives an impedance $R_{BAT}$ in series with the coil. This impedance usually has an inductive character so that the coil current ripple can cause a high voltage variation at the battery voltage connection of the coil on the PCB. Since also other applications may be connected at that point, it is usually decoupled to ground with a capacitor and thus creating a low pass filter between battery and coil. To avoid excessive currents in the coil $L_{BST}$, a current protection is usually implemented. In a power stage that contains switches $S_L$ and $S_H$ and that is designed for switching inductive loads, a common way to implement such a protection is:

to measure the current in the inductor, to open the switch that was closed when the maximum current is detected, to close the switch that was open so that the inductor current will decrease.

Figure 1K:
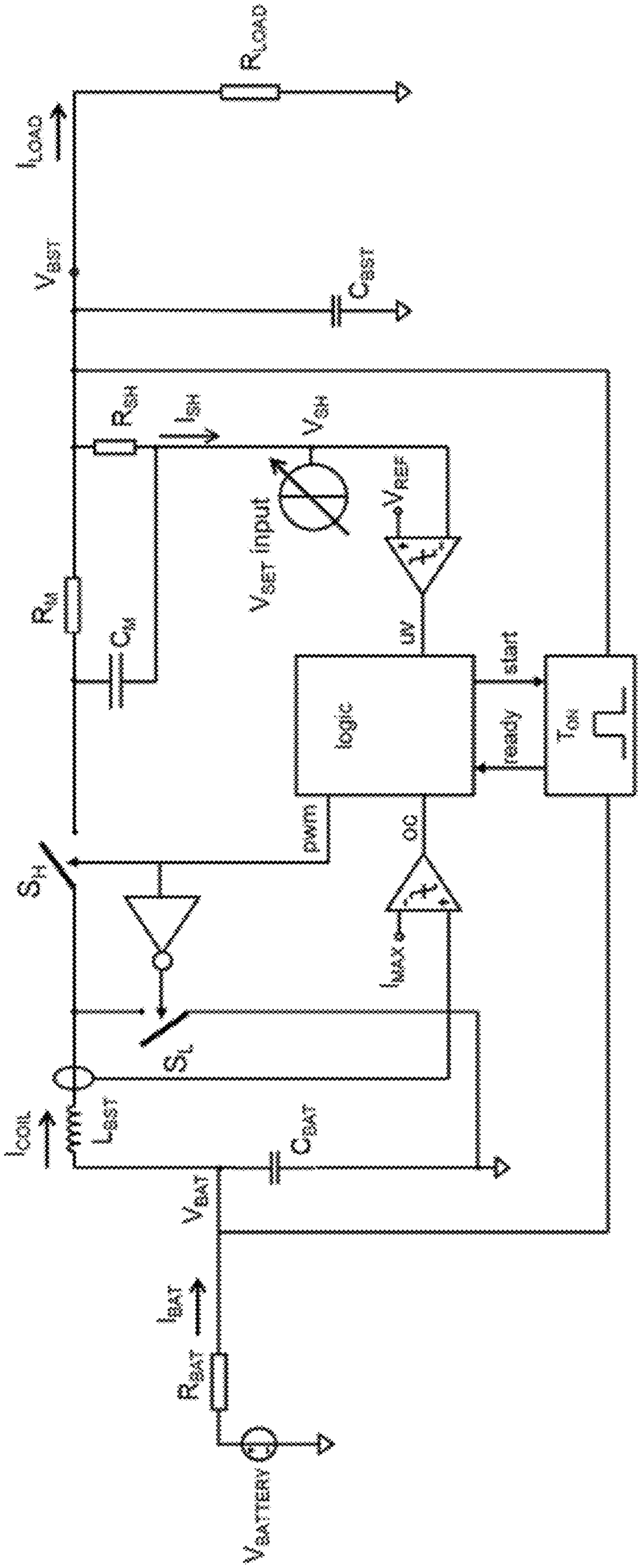
Figures 1L, 1M, 1N, 1O, 1P:
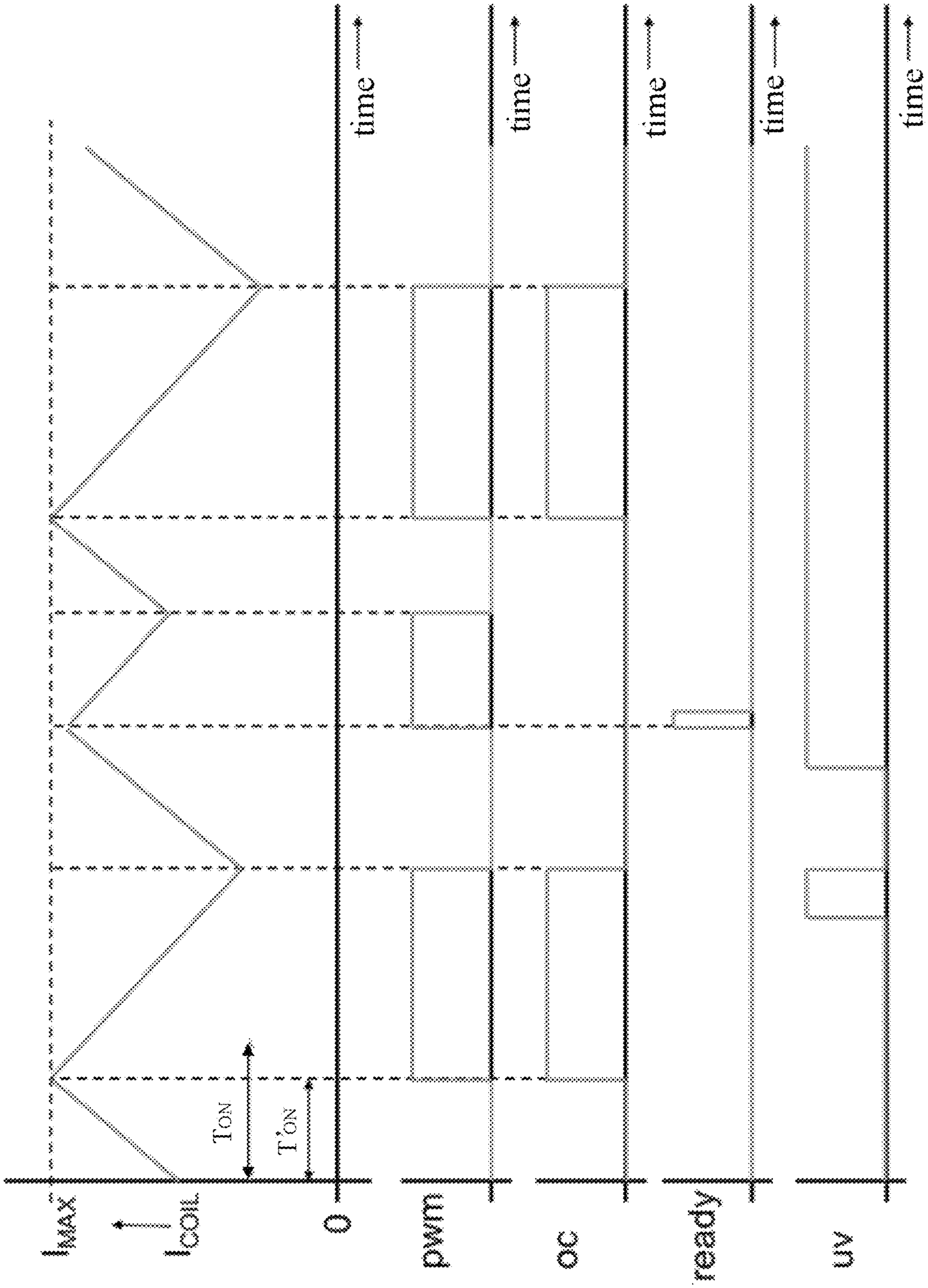
Figure 1Q:
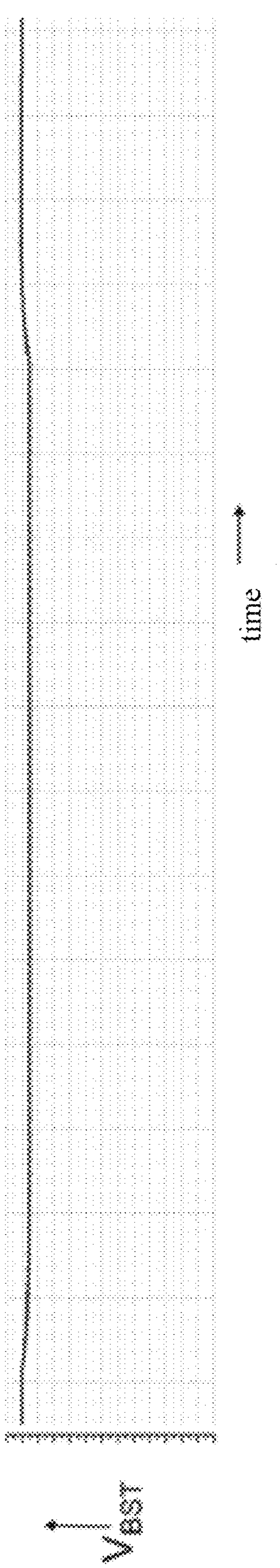
Figure 1R:
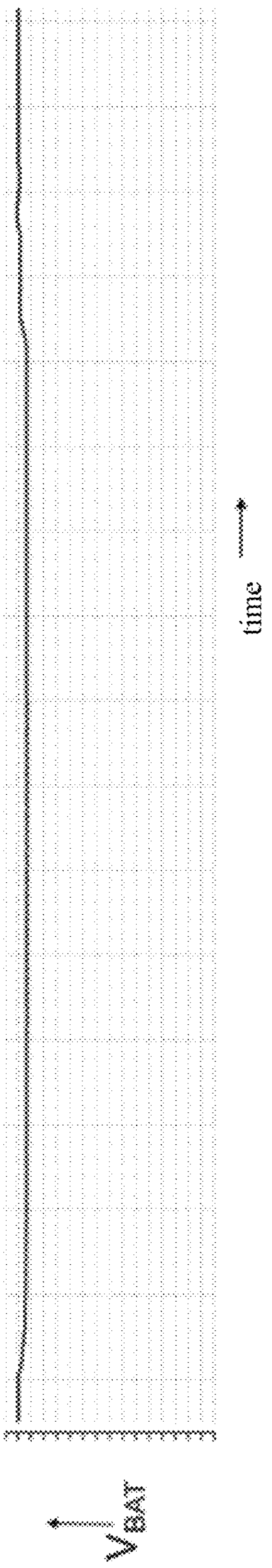
Figure 1S:
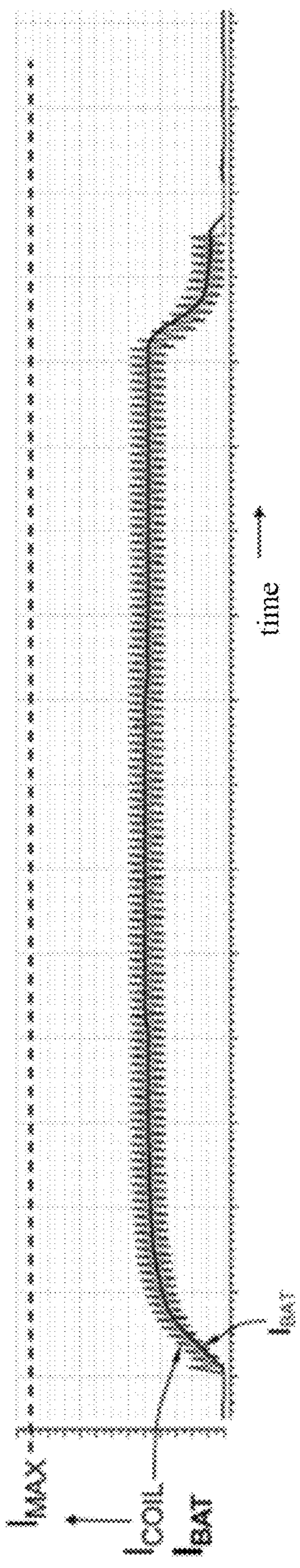
Figure 1T:
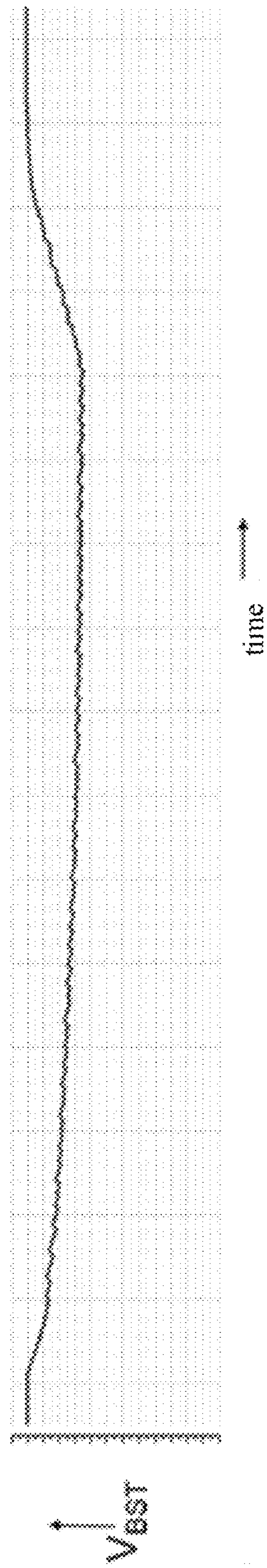
Figure 1U:
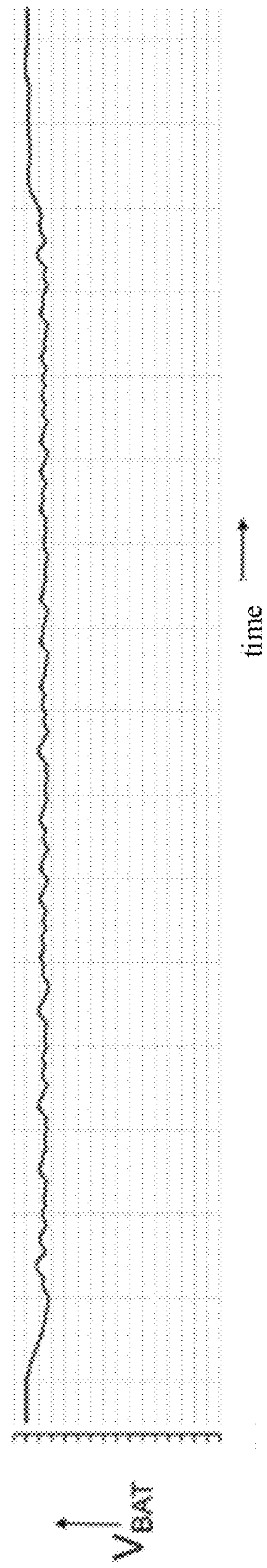
Figure 1V:
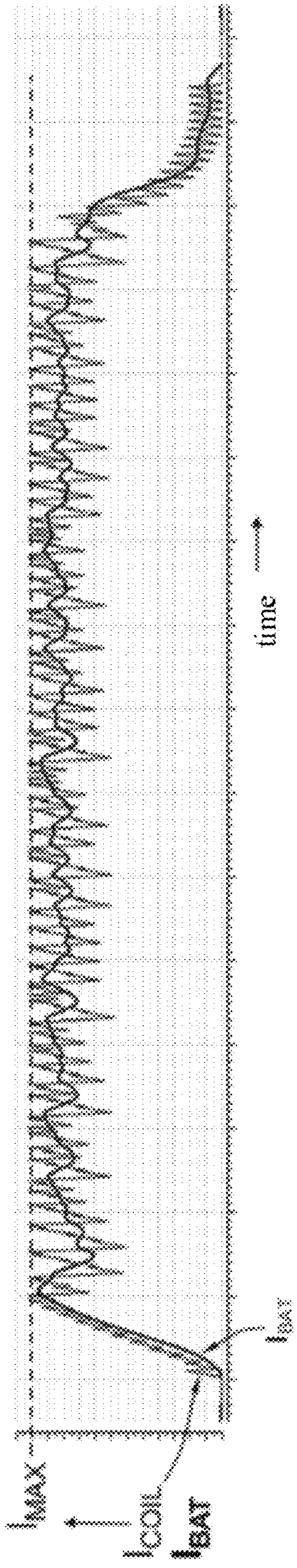

A COT boost converter with current limiter and battery decoupling can be seen in FIG. 1K. A signal oc is set as soon as $I_{COIL}$ exceeds $I_{MAX}$ and reset when pwm goes low. Even before ready of the on-time generation goes high, oc forces $S_H$ to close and $S_L$ to open so that $I_{COIL}$ will no longer increase, but start decreasing. This overcurrent protection will nicely limit the maximum current. However, because $T_{ON}$ now deviates from the intended value as can be seen in FIGS. 1L-1P where the overcurrent protection interferes in the first and third pwm pulse. Because the overcurrent signal interrupts the normal switching sequence, the constant-on-time control loop is now out of control and can no longer maintain the intended boost voltage. Of course the boost voltage will drop due to the current limiting, that is inevitable, but the inductor current during this limiting action has unpredictable low frequency patterns with high amplitude. The voltage on the battery decoupling capacitor $V_{BAT}$ is also affected by this current limiting behavior as can be seen in FIGS. 1Q-1V where the response of the system to a moderate load step shown in FIGS. 1Q-1S is compared with the response to a high load step with current limiting in FIGS. 1T-1V.

Figure 2A:
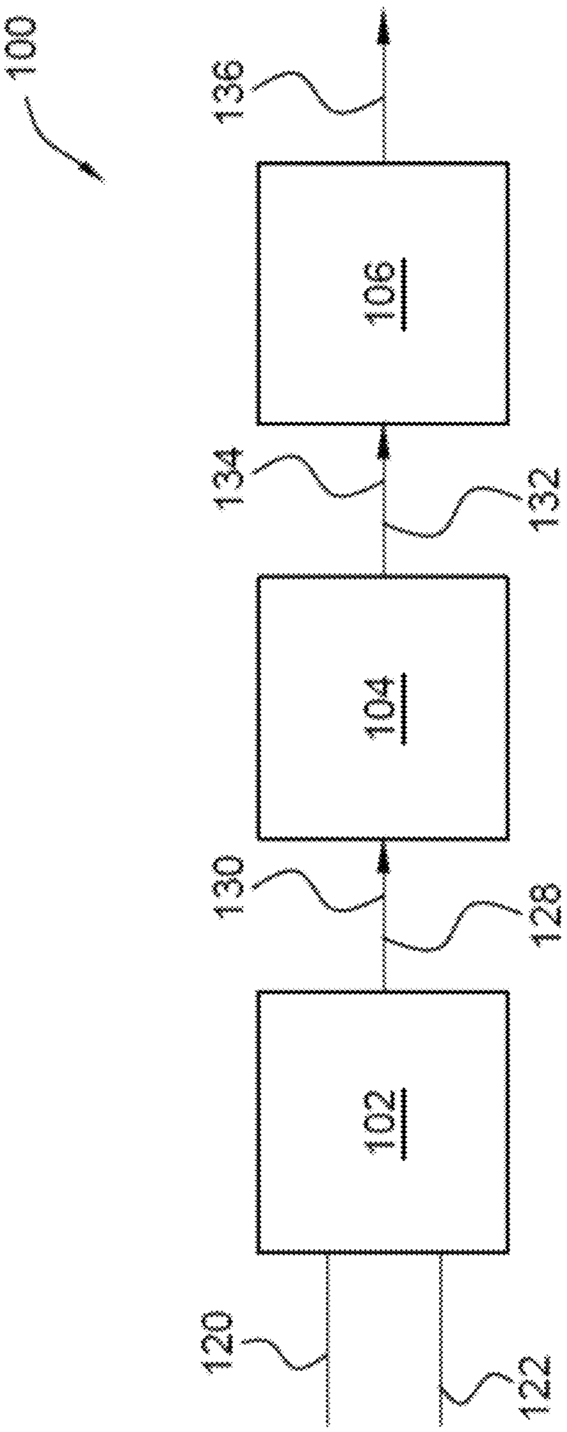
FIG. 2A shows a schematic of a control circuit for a boost converter according to an embodiment of the disclosure.

FIG. 2A shows a schematic of a control circuit 100 for a boost converter according to an embodiment of the disclosure. The control circuit 100 comprises comparison means 102, off-time signal generation means 104, and switching means 106.

The comparison means 102 of the control circuit 100 shown in FIG. 2A comprises a first input 120, a second input 122 and an output 128. The first input 120 is configured to receive information regarding an input current at an inductor of a boost converter circuit. The second input 122 is configured to receive a first threshold value indicating a predetermined maximum input current. The comparison means 102 is configured to decide whether the input current is higher than the predetermined maximum input current by comparing the information regarding the input current received at the first input 120 and the first threshold value received at the second input 122. The comparison means 102 may generate a signal at the output 128 indicating whether the input current is higher than the predetermined maximum input current.

The off-time signal generation means 104 of the control circuit 100 shown in FIG. 2A comprises an input 130 and an output 132. The input 130 is configured to receive the signal generated by the comparison means 102 at the output 128. The off-time signal generation means 104 is further configured to generate an off-time signal at the output 132. The off-time signal is generated based on the signal received at the input 130. The off-time signal will be used to generate an energy discharging state of a next switching event of the boost converter circuit. The switching means 106 of the control circuit 100 shown in FIG. 2A comprises an input 134 and an output 136. The input 134 of the switching means 106 is configured to receive the off-time signal at the output 132 of the off-time signal generation 104. The switching means 106 is configured to switch the boost converter to perform cycles by starting switching events wherein each cycle or switching event comprises an energy charging state in which an inductor stores energy provided by an input voltage at an input of the boost converter circuit and an energy discharging state in which the inductor provides energy to an output of the boost converter circuit. The switching means 106 will start a new cycle or switching event wherein the inductor will start charging energy and, when the current at the inductor reaches a maximum current, the comparison means 102 will indicate to the off-time signal generation means 104 that the inductor reaches the maximum current. The off-time signal generation means 104 will then generate the off-time signal at the output 132 which will be received by the switching means 106. The switching means 106 will then control the boost converter circuit to enter into an energy discharging state wherein the inductor starts discharging energy to the output of the boost converter circuit. The boost converter circuit will be in the energy discharging state until the off-time signal is deactivated.

The off-time signal will force the boost converter circuit to be in an energy discharging state for a constant amount of time $T_{OFF}$. The duration $T_{OFF}$ of the off-time signal may be chosen to depend on the input voltage $V_{BAT}$ of the boost converter circuit, the output voltage $V_{BST}$ of the boost converter circuit and the intended switching frequency $f_{TARGET}$ as indicated below:

$$T_{OFF} = \frac{V_{BAT}}{f_{TARGET} V_{BST}}.$$

The comparison means 102, the off-time generator means 104 and the switching means 106 of the control circuit 100 may be connected in a different way that still provides the same functionality. For instance, the comparison means 102 may be configured to provide the information indicating whether the inductor current exceeds the maximum current to the switching means 106 and the switching means 106, based on that information may provide a signal to the off-time generation means 104 such that, based on that signal, the off-time generation means 104 will generate and send the off-time signal to the switching means 106. The switching means 106 will then switch accordingly the boost converter circuit. The control circuit 100 may comprise any other suitable form of connection among the different parts or any other elements. The comparison means 102, the off-time generation means 104 and the switching means 106 may comprise any kind of electrical elements and/or gate logic allowing to perform the corresponding function of each one. For instance, the comparison means 102 may comprise an operational comparator or any other gate logic element.

Figure 2B:
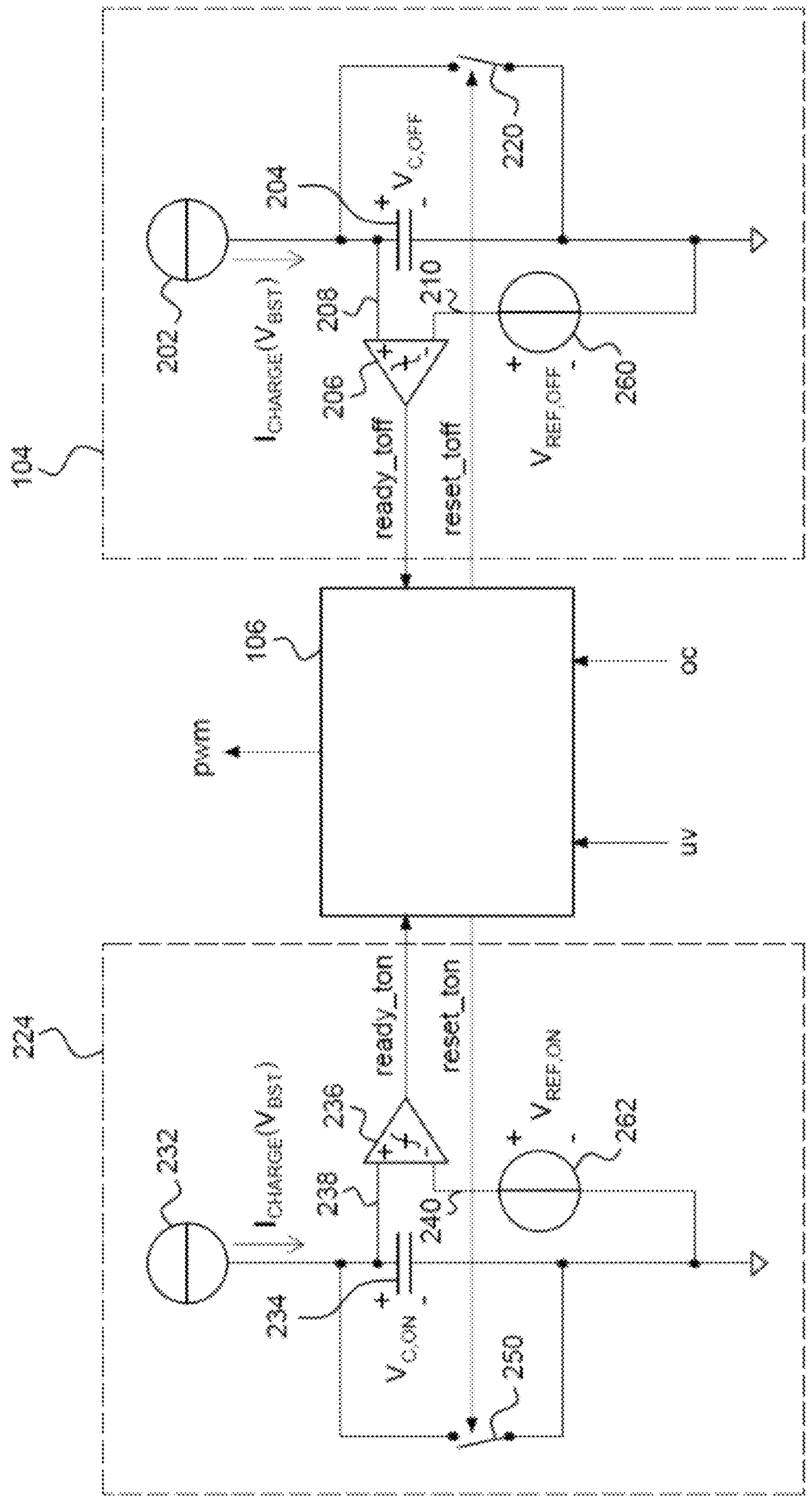
FIG. 2B shows a circuit according to an embodiment of the disclosure.

FIG. 2B shows a control circuit 200 according to an embodiment of the disclosure. The control circuit 200 comprises switching means 106 and off-time signal generation means 104. The control circuit 200 of FIG. 2B also comprises on-time signal generation means 224 which can be very similar to the off-time signal generation means 104. The on-time signal generation means 224 will be used when current limiting is not necessary and the off-time signal generation means 104 will be used when current limiting is necessary (i.e., when the current in the inductor exceeds the maximum predetermined current). In this way, the switching means are configured to switch the boost converter between a first current operation mode (wherein the off-time signal generation means 104 will be used to determine the duration of the energy discharging state) and a second voltage operation mode (wherein the on-time signal generation means 224 will be used to generate the duration of the energy charging state) based on whether a current at the inductor is higher than the predetermined maximum current.

The off-time signal generation circuit 104 in FIG. 2B comprises a current source 202, a capacitor 204 and a comparator 206. The comparator 206 comprises a first input 208 configured to receive a voltage $V_{C,OFF}$ across the capacitor 204. The comparator 206 comprises a second input 210 configured to receive a reference voltage $V_{REF,OFF}$, wherein the reference voltage $V_{REF,OFF}$ is equal or proportional to the input voltage of the boost converter circuit $V_{BAT}$. The capacitor 204 is configured to store a voltage $V_{C,OFF}$ based on the feedback current $I_{CHARGE}$ that is proportional to the output voltage of the boost converter circuit $V_{BST}$. The comparator 206 generates a ready_toff signal based on the result of the comparison between the first input 208 and the second input 210. The switching means 106 is configured to receive the ready_toff signal based on said comparison and to generate a pwm signal to switch the control boost circuit to enter in an energy discharging state for a time $T_{OFF}$ equal to $$\frac{V_{BAT}}{f_{TARGET} V_{BST}}.$$

The switching means 106 is also configured to generate a reset_toff signal that controls a switch 220 to close such that a voltage $V_{C,OFF}$ across the capacitor 204 increases linearly with time until the first input 208 of the comparator 206 reaches the reference voltage $V_{REF,OFF}$ received at the second input 210 of the comparator 206. At that moment, the comparator 206 generates the ready_toff signal which opens the switch 220 and resets the voltage $V_{C,OFF}$ to zero. The reference voltage $V_{REF,OFF}$ is generated by a voltage source 260.

The on-time signal generation circuit 224 of FIG. 2B is similar to the off-time generation circuit 104 and also comprises another capacitor 234 and another comparison circuit or comparator 236 wherein the another capacitor is configured to store another voltage $V_{C,ON}$, wherein the another comparison circuit comprises a first input 240, a second input 238, wherein the another comparison circuit is configured to receive another reference voltage $V_{REF,ON}$ at the first input, to receive the another voltage $V_{C,ON}$ at the second input, and to generate an on-time signal ready t_on by comparing the another reference voltage $V_{REF,ON}$ and the another voltage $V_{C,ON}$. The another reference voltage $V_{REF,ON}$ is generated by a voltage source 262. The signal ready_ton is provided to the switching means 106. The another reference voltage $V_{REF,ON}$ generated by the voltage source 262 is equal or proportional to $V_{BST}$-$V_{BAT}$. The switching means 106 is configured to receive the ready_ton signal and to generate the pwm signal to switch the control boost circuit to enter in an energy charging state for a time $T_{ON}$ equal to $$\frac{V_{BST} - V_{BAT}}{f_{TARGET} V_{BST}}.$$

The switching means 106 is also configured to generate a reset_ton signal that controls a switch 250 to reset the voltage $V_{C,ON}$ of the capacitor 234 to zero. When reset_ton is not active the switch 250 is open and the another voltage $V_{C,ON}$ across the another capacitor 234 increases linearly with time until the second input 238 of the another comparator 236 reaches the another reference voltage $V_{REF,ON}$ generated by the voltage source 262. At that moment, the another comparator 236 generates the ready_ton signal which opens the switch 250 and resets the another voltage $V_{C,ON}$ of the another capacitor 234 to zero.

The switching means 106 is configured to receive an overcurrent oc signal and an undervoltage uv signal wherein the oc signal and the uv signal will be generated by the comparison means 102 shown in FIG. 2A. Though in FIG. 2A the output 128 of the comparison means 102 is connected to the off-time signal generation means 104, as said before said output 128 can be connected to the switching means 106 such that the switching means 106 will send the reset_ton signal or the reset_toff signal respectively to the on-time signal generation 224 or the off-time signal generation 104. As said, in this way the switching means can switch the boost converter circuit between the first current operation mode wherein the off-time signal generation means 104 determine the duration of the energy discharging state and the second voltage operation mode wherein the on-time signal generation means 224 determine the duration of the energy charging state based on whether a current at the inductor is higher than the predetermined maximum current. The switching means will switch the boost converter circuit between the first current operation mode and the second voltage operation mode based on whether a current at the inductor is higher than the predetermined maximum current such that when the current at the inductor is higher than the predetermined maximum current the boost converter circuit will be working in the first current operation mode, and when the current at the inductor is not higher than the predetermined maximum current the boost converter circuit will be working in the second voltage operation mode. This allows to limit the maximum current while still providing a stable switching frequency.

Figure 3:
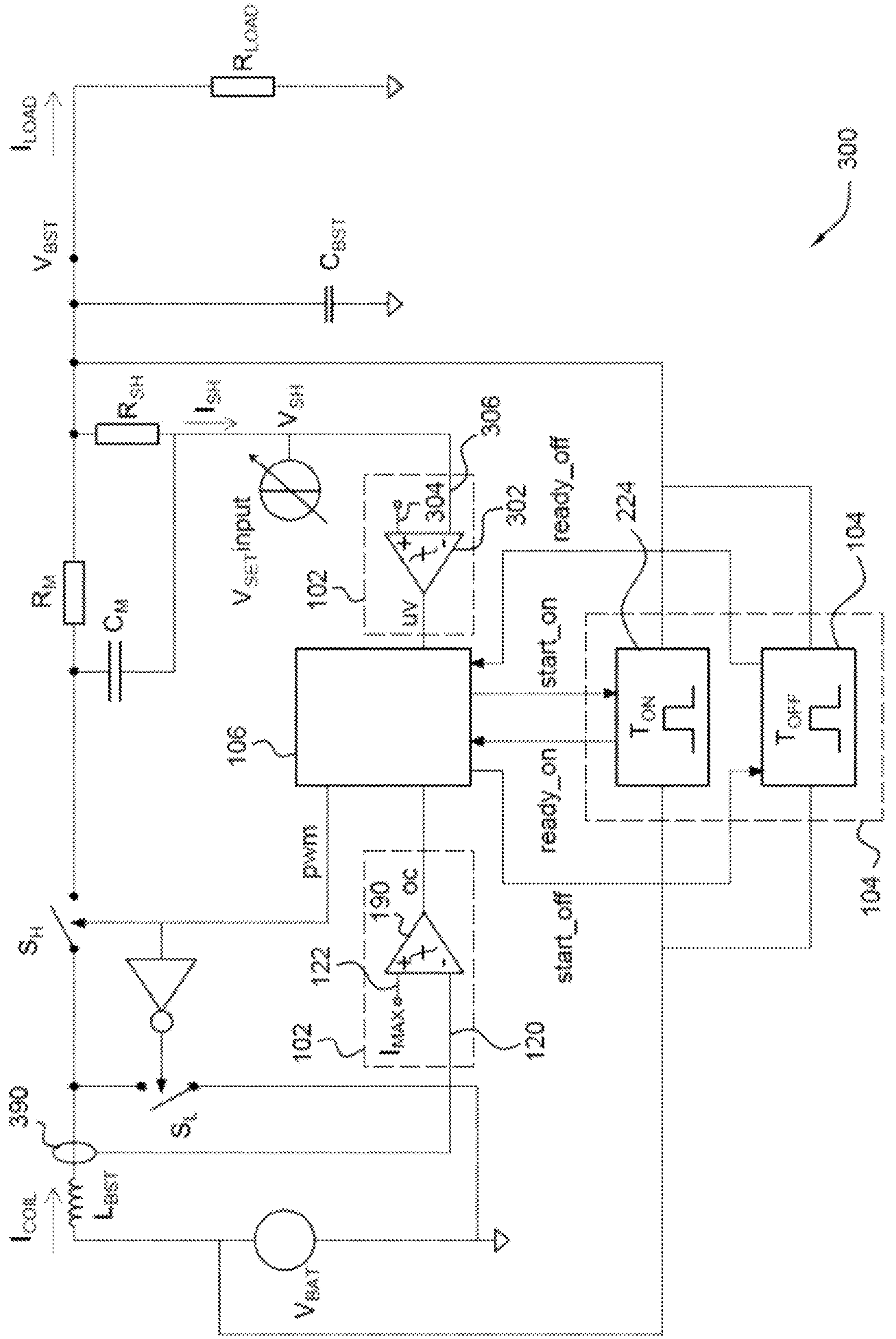
FIG. 3 shows a boost converter circuit according to an embodiment of the disclosure.
Figures 4A, 4B, 4C, 4D, 4E:
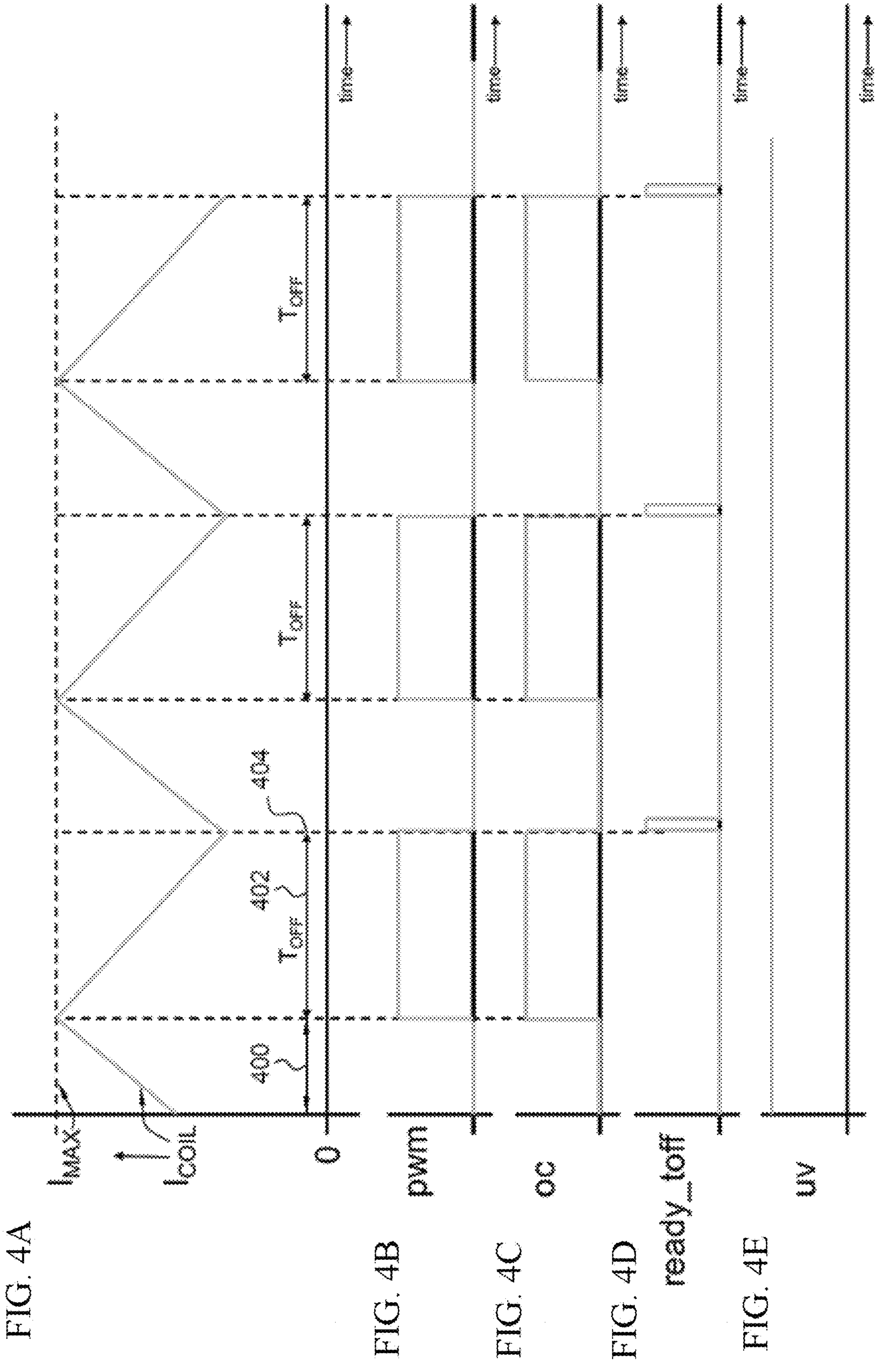
FIGS. 4A-4E show diagrams of time waveforms of several signals of the boost converter circuit of FIG. 3 during operation.

FIG. 3 shows a boost converter circuit 300 according to an embodiment of the disclosure. FIGS. 4A-4E show diagrams of time waveforms of several signals of the boost converter circuit of FIG. 3 during operation. FIG. 4A illustrates the value of $I_{COIL}$ as a function of time in the boost converter circuit of FIG. 3. The current $I_{COIL}$ is the current through the inductor $L_{BST}$ shown in FIG. 3. FIGS. 4B-4E illustrate respectively the pwm signal, the oc signal, the ready_toff signal and the uv signal as a function of time.

The boost converter circuit 300 of FIG. 3 comprises an inductor $L_{BST}$ connected at an input voltage $V_{BAT}$ generated by a battery, for instance, and a switch $S_L$ and a switch $S_H$. The boost converter circuit 300 of FIG. 3 comprises further switching means 106, comparison means 102 and off and on-time signal generation means 104 and 224. The comparator means 102 comprises a comparator 190 configured to receive the maximum current $I_{MAX}$ at the second input 122, to receive the current passing through the inductor $I_{COIL}$ (and measured by a current measurement device 390) at a first input 120 and to generate the oc signal indicating that the inductor current $I_{COIL}$ exceeds the maximum current $I_{MAX}$. The comparator means 102 further comprises the comparator 302 comprising a first input 304 configured to receive a minimum voltage, and comprising a second input 306 configured to receive the voltage $V_{SH}=V_{BST}-I_{SH}*R_{SH}$ and to generate the uv signal indicating that the output voltage $V_{BST}$ is below the minimum voltage. When the oc signal is activated, the switching means 106 switches to the off-time operation mode (i.e., the first current operation mode) and activates the off-signal generation 104. When the uv signal is de-activated, the switching means 106 switches to the on-time operation mode (i.e., the second voltage operation mode) and activates the on-signal generation 104. Toggling between the two modes of operation (voltage mode and current mode) is implemented in logic and initiated by the overcurrent signal oc for moving to current mode, and the NOT (uv) signal (i.e., the invert of the signal uv) indicating the boost voltage is above the minimum voltage.

During a time interval 400 shown in FIG. 4A, the switch $S_L$ is closed and the switch $S_H$ is open in order to connect the inductor $L_{BST}$ of FIG. 3 to the ground. When the inductor $L_{BST}$ is connected to ground, the boost converter circuit 300 enters into an energy charging state in which current flows through the inductor $L_{BST}$ and the inductor $L_{BST}$ stores some energy by generating a magnetic field. The current $I_{COIL}$ in the inductor $L_{BST}$ increases during said time interval 400 as it can be as shown in FIG. 4A. When the inductor current $I_{COIL}$ reaches the maximum current $I_{MAX}$, the overcurrent signal ov is activated as shown in FIG. 4C and the switching means 106 sends a control signal pwm, as shown in FIG. 4B, to open the switch $S_L$ in order to disconnect the inductor $L_{BST}$ from the ground, and to close the switch $S_H$ in order to connect the inductor $L_{BST}$ to the output $V_{BST}$ and the boost converter circuit enters into an energy discharging state in which, during the time interval 402 shown in FIG. 4A, the energy previously accumulated in the inductor $L_{BST}$ is transferred to the output $V_{BST}$ and the current $I_{COIL}$ in the inductor $L_{BST}$ starts decreasing during a period $T_{OFF}$ after which the oc signal is de-activated, and the signal pwm is set to zero thereby switching the switches $S_H$ and $S_L$ of the boost converter circuit such that a new charging period starts in 404. Time intervals 400 and 402 are part in this case of a continuous mode event wherein a completed switching cycle has been performed by the circuit. A new continuous mode event starts after time interval 402.

Figure 5:
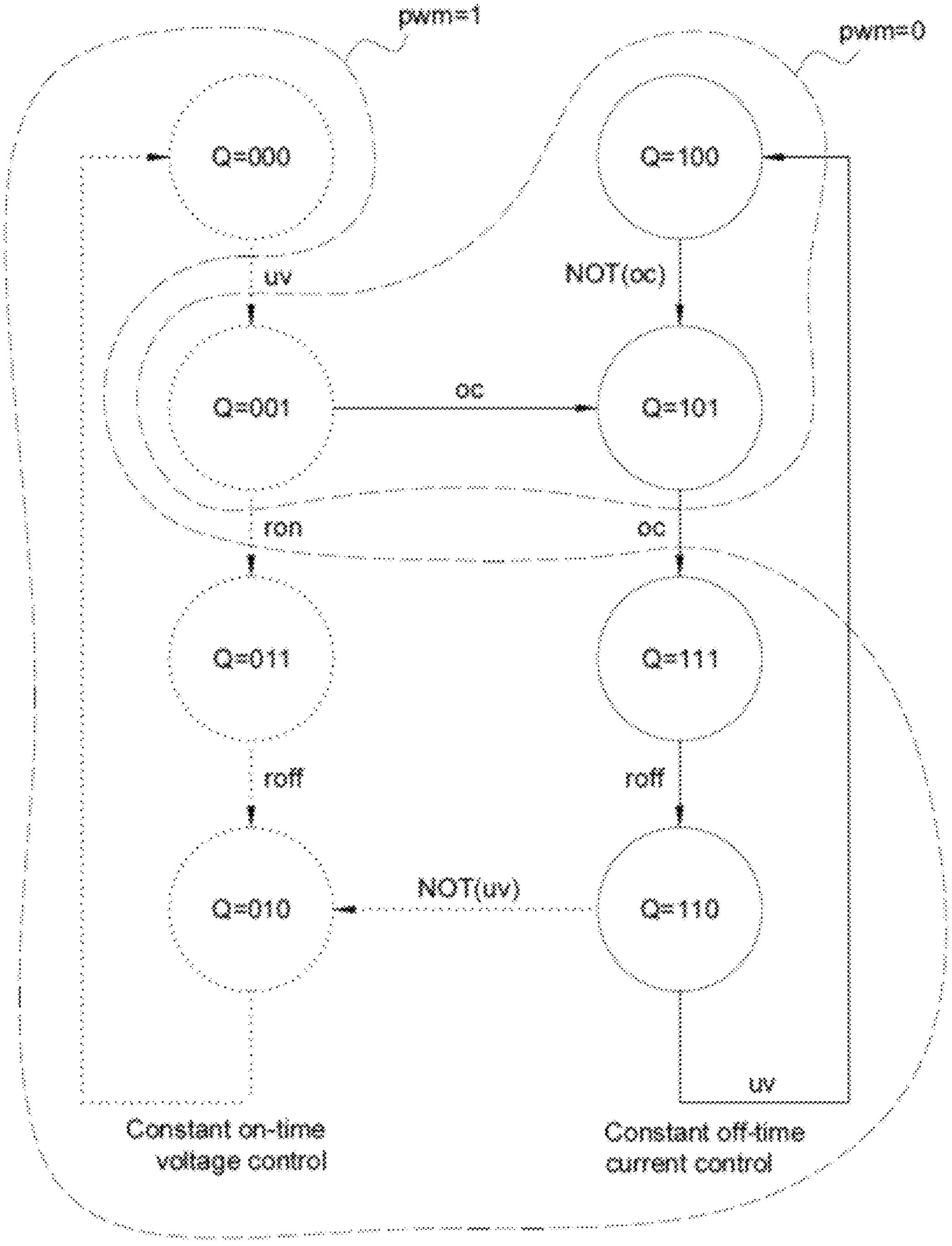
FIG. 5 shows a flow diagram of a method to operate a control circuit according to an embodiment of the disclosure.

FIG. 5 shows a flow diagram of a method to operate a control circuit according to an embodiment of the disclosure wherein a three-bit state machine Q is used. The switching cycles in both voltage and current mode are controlled as can be seen in FIG. 5. The operation of the state machine is described below, discussing every state, starting in state Q=000.

State Q=000

The system is in voltage mode, using constant on-time control (i.e., the second voltage operation mode). The pwm signal is active and a rising edge on the under voltage uv signal will initiate the on time charging state by a transition to state Q=001.

State Q=001

When Q=001, the signal pwm is made zero, so the switch $S_L$ in FIG. 3 will be switched on, the switch $S_H$ will be switched off and the current through the inductor $I_{COIL}$ will increase. Also, a timer is started in this state by the reset_ton signal which will have a value of zero and the on voltage $V_{C,ON}$ will ramp-up until it exceeds the on reference voltage $V_{REF,ON}$. The comparator 236 shown in FIG. 2B will then generate a rising edge on the ready_ton (ron in FIG. 5) signal that will cause the transition to state Q=011.

However, if the over current signal oc goes high before the ready_ton signal, the transition to state Q=101 is made and constant-off-time-control (i.e. the first current operation mode) is entered wherein the current is limited.

State Q=011

In state Q=011 the signal pwm is activated by the value 1 so the switch $S_L$ will be switched off, the switch $S_H$ will be switched on and the current through the inductor $I_{COIL}$ will be dumped to the output capacitor and decrease. A transition to state 010 is made automatically (by activating the ready_toff signal called roff in FIG. 5) after a certain delay time that guarantees a minimum time for the signal pwm=1.

State Q=010

A transition is made to Q=000 automatically. (This state is only used for transition from 011 to 000 to avoid resetting multiple bits simultaneously).

State Q=101

This state is entered after a rising edge on the over current signal oc in state Q=001 (while the switch $S_L$ is on and the signal pwm is equal to zero). Now, the current loop has been entered and constant-off-time control is used. The oc signal initiated the off-time signal and a transition to state 111 is made immediately.

State Q=111

Here the signal pwm is equal to one so that the switch $S_L$ (that experienced the over current event) is switched off and the switch $S_H$ will be switched on and the current through the inductor $I_{COIL}$ will decrease. The signal reset_toff is low so that the voltage $V_{C,OFF}$ in the capacitor 204 will ramp-up until it exceeds the reference voltage $V_{REF,OFF}$. The comparator 206 will then generate a rising edge on the ready_toff (roff) signal that will initiate the transition to state Q=110.

State Q=110

If the output voltage is still below target (i.e., the signal uv is equal to one), the system remains in the current mode and the transition to state 100 is made automatically. However, if the output boost voltage is back to a level above the target level (i.e., the uv signal is zero), the transition to state 010 is made and the system jumps back to voltage control (second voltage operation mode).

State Q=100

In state Q=100, the signal pwm is equal to zero and causes the switch $S_L$ to close and the switch $S_H$ to open, and the current through the inductor $I_{COIL}$ increases. The oc signal will be reset to zero causing a transition to state Q=101 where it waits until the inductor current reached the overcurrent level again.

Figure 6A:
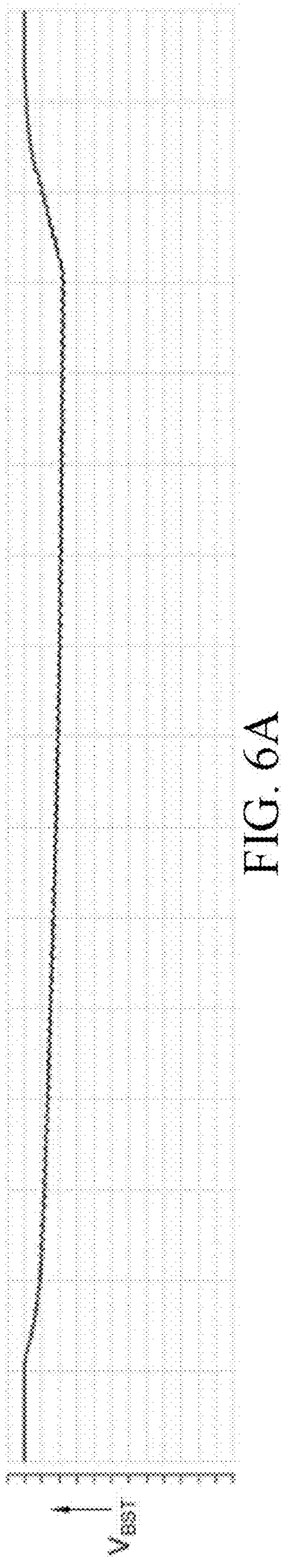
FIGS. 6A-6C, 7A-7D and 8A-8D show diagrams of the waveforms of several signals of the boost converter of FIG. 3 when operated according to FIG. 5.
Figure 6B:
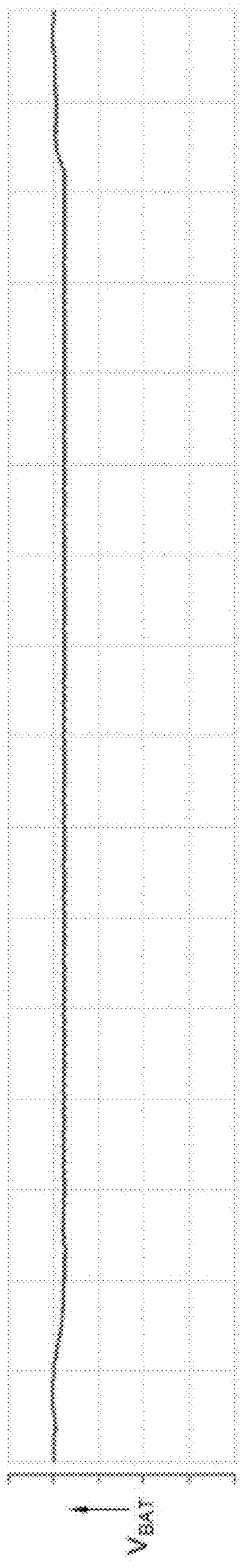
Figure 6C:
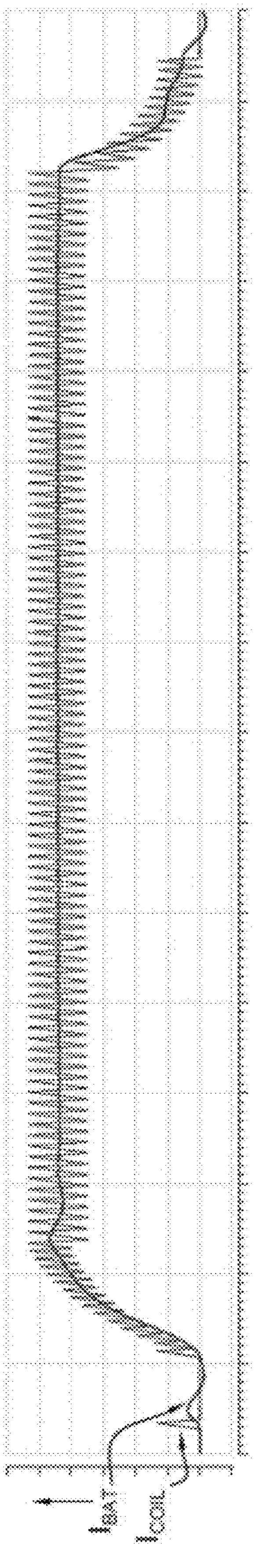
Figure 7A:
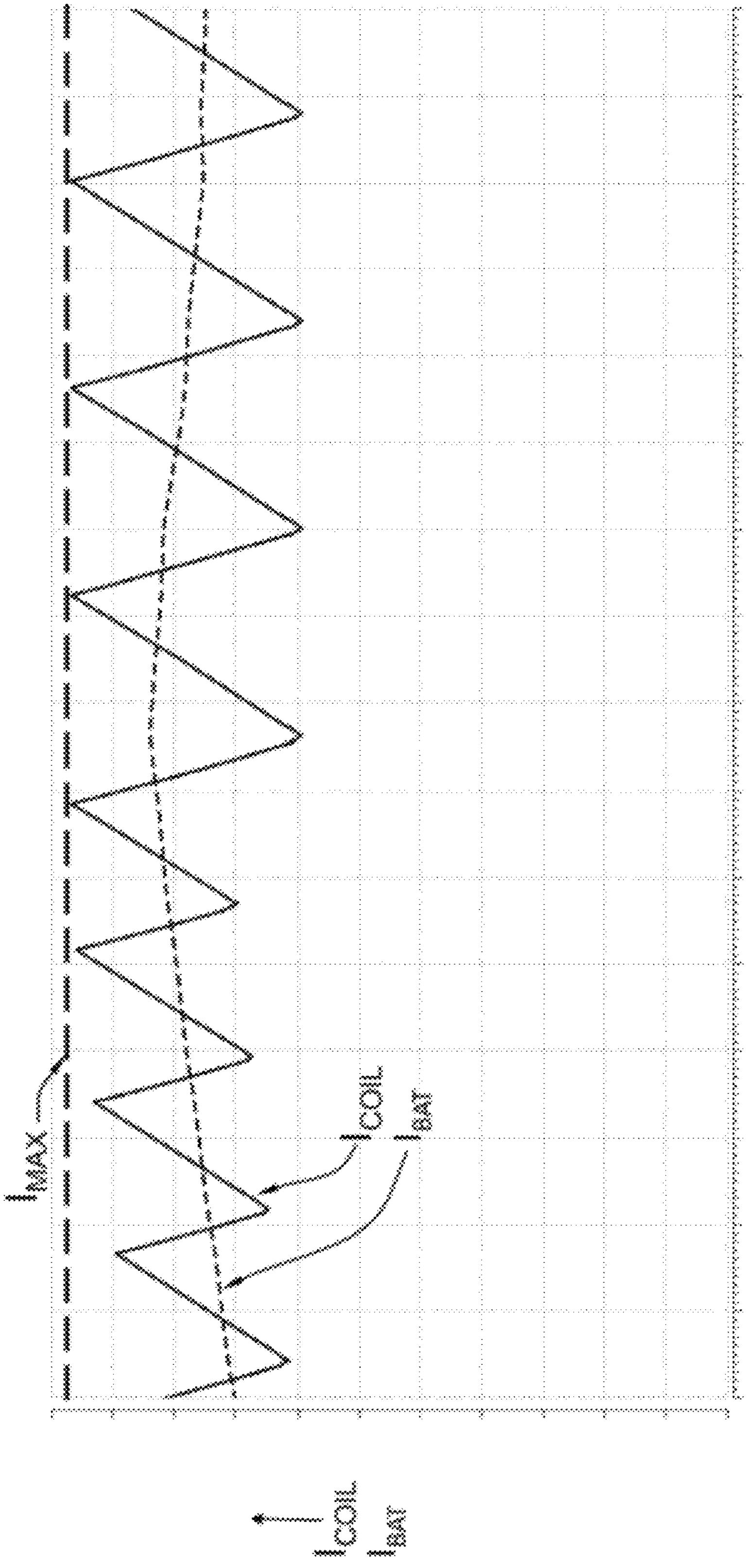
Figure 7B:
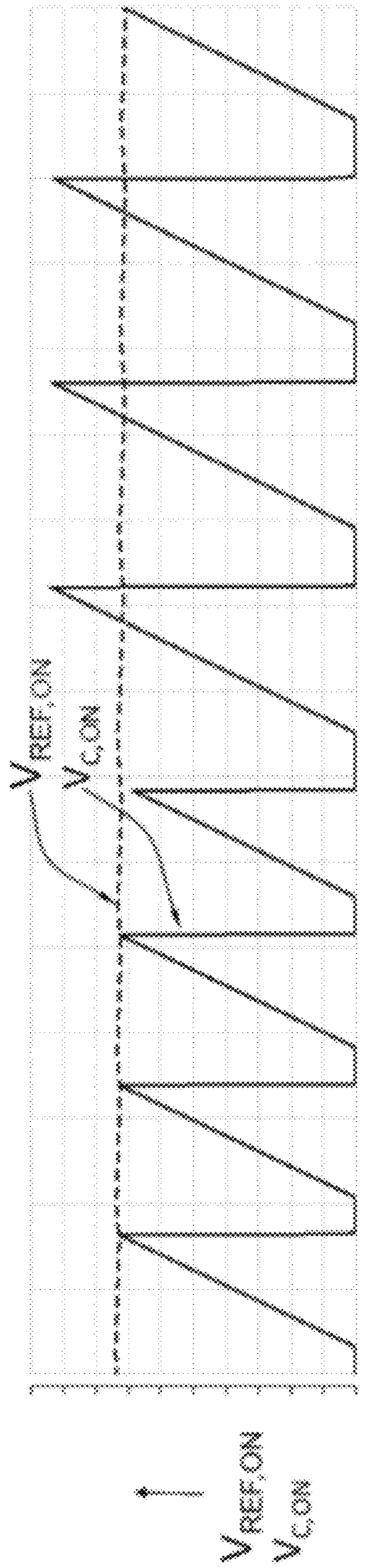
Figure 7C:
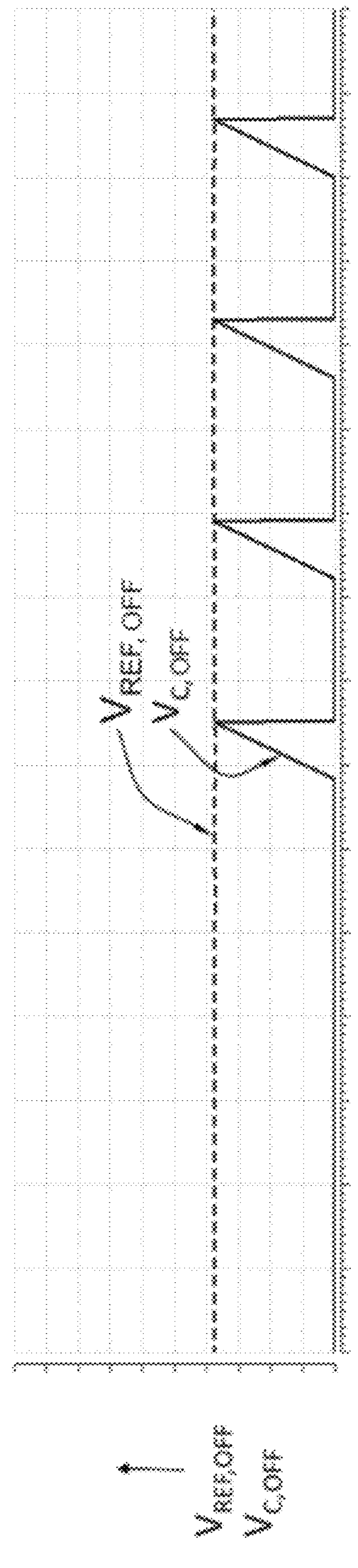
Figure 7D:
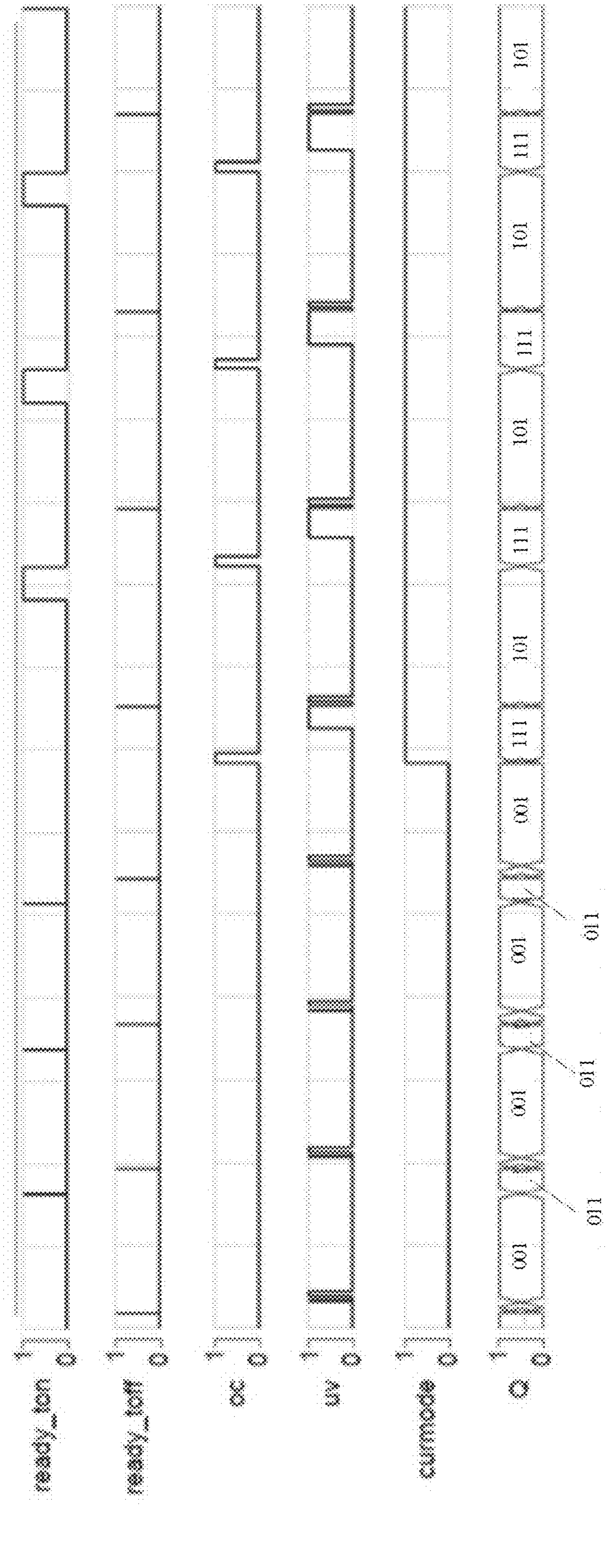
Figure 8A:
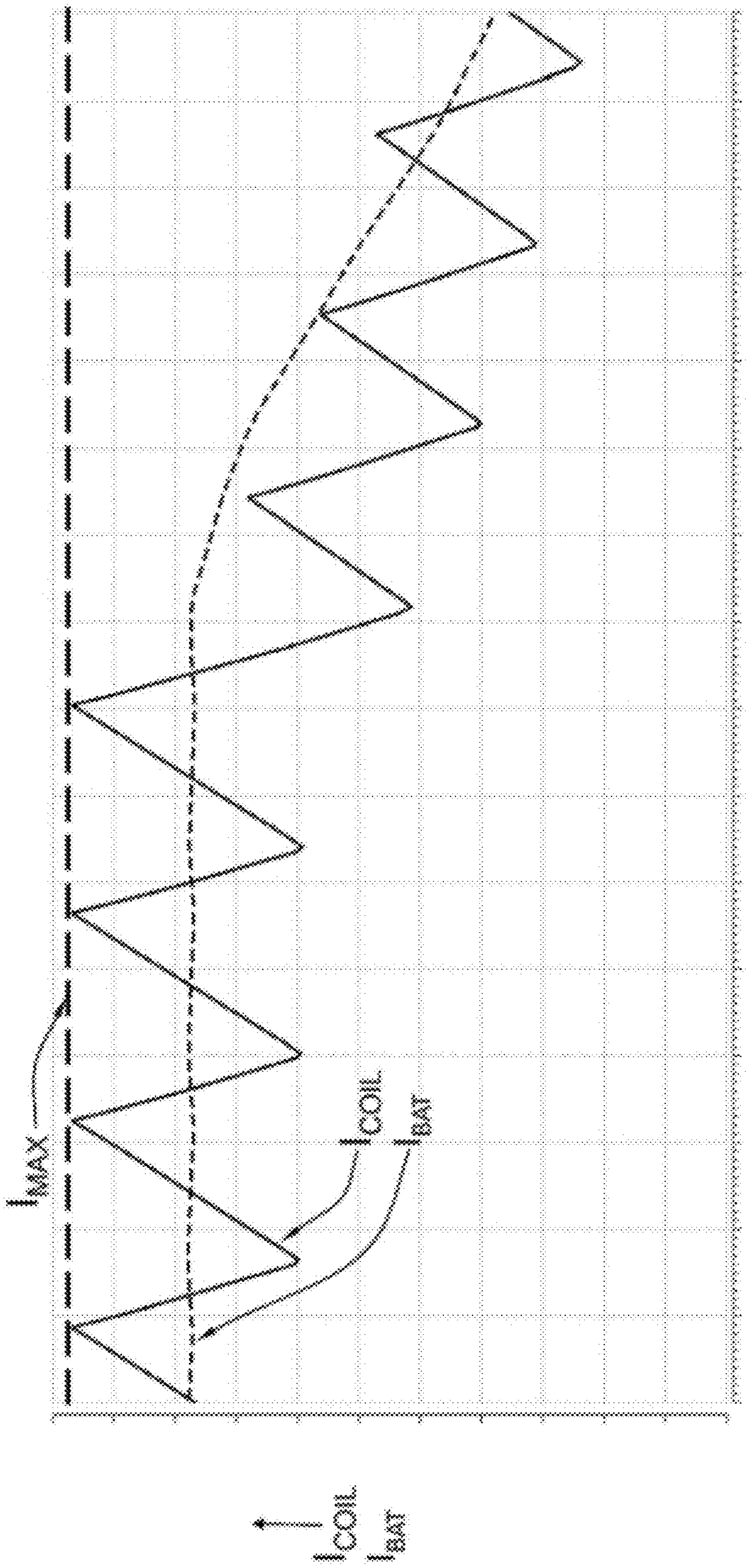
Figure 8B:
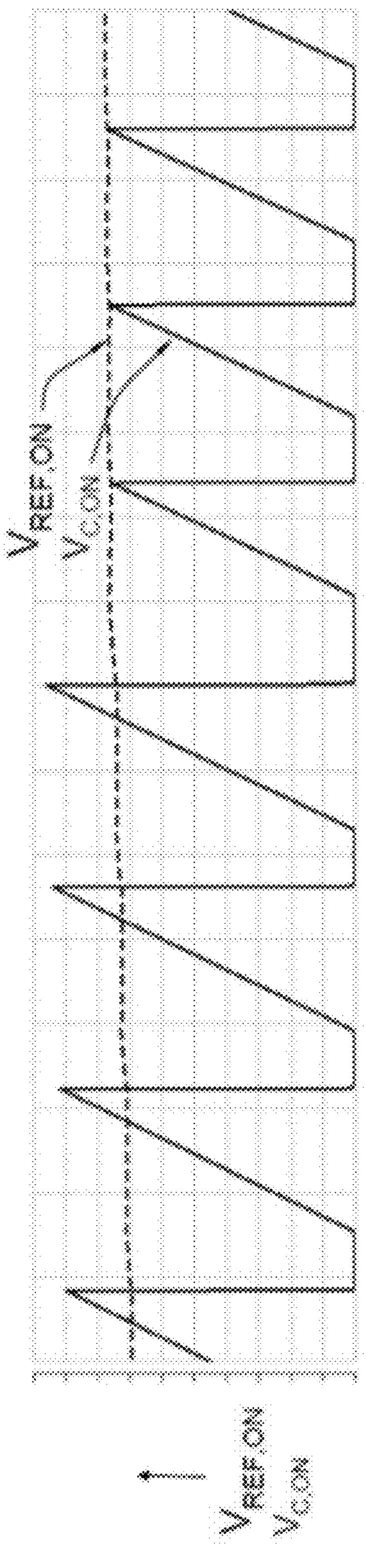
Figure 8C:
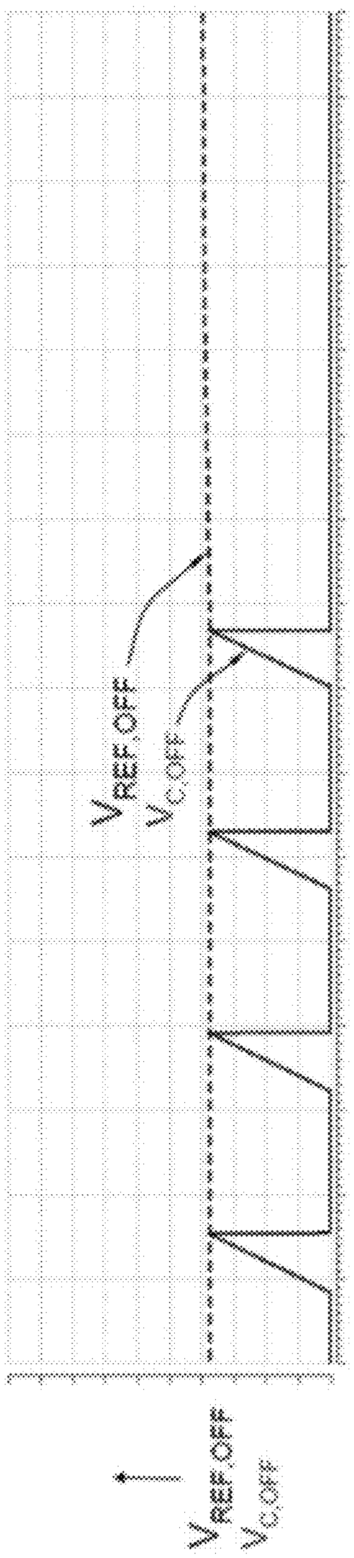
Figure 8D:
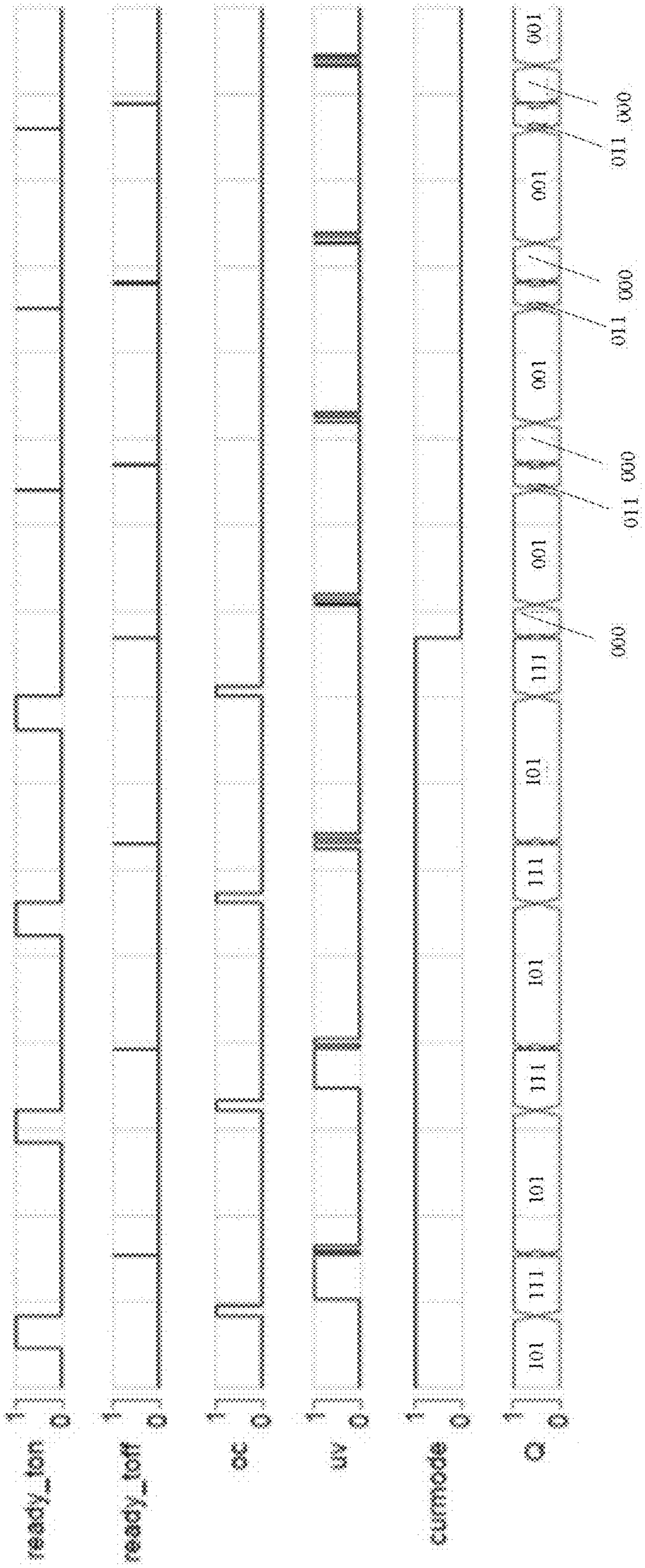

FIGS. 6A-6C show diagrams of the waveforms of the output voltage $V_{BST}$, the input voltage $V_{BAT}$, and the inductor current $I_{COIL}$ and the battery current $I_{BAT}$, respectively, of the boost converter of FIG. 3 when operated according to the method shown in FIG. 5. In FIGS. 6A-6C, the response of the system to a heavy load step with current limiting can be seen. The frequency during current limiting is constant, the input current $I_{BAT}$ and the input voltage $V_{BAT}$ have a smooth behaviour, and the peak current limiter $I_{MAX}$ can be used for battery current limitation when the appropriate compensation for the chosen switching frequency is used.

FIGS. 7A-7D show diagrams of the waveforms of the inductor current $I_{COIL}$, the maximum current $I_{MAX}$ and the battery current $I_{BAT}$ (FIG. 7A), the voltages $V_{REF,ON}$ and $V_{C,ON}$ (FIG. 7B), the voltages $V_{REF,OFF}$ and $V_{C,OFF}$ (FIG. 7C), and the signals ready_ton, ready_toff, curmode, oc and state Q (FIG. 7D), respectively, of the boost converter of FIG. 3 when operated according to the state machine shown in FIG. 5 when the current mode is entered and the oc signal determines the start of the energy discharging period while $T_{OFF}$ determines the length of the energy discharging period. The signal curmode is 1 when the current mode is on and 0 when the current mode is off. FIGS. 7A-7D share a common time line as indicated by the grid lines shown in said figures.

FIGS. 8A-8D show the same signals as FIGS. 7A-7D, respectively, when the current mode is left, and also share a common time line as indicated by the grid lines shown in said figures. The first time when the uv signal goes low while state Q=110, the state Q will go to 010 and the curmode signal will go to zero and constant-on-time control is resumed.

Now that the frequency in current mode is controlled, just as in the case of voltage mode, the peak-peak ripple current amplitude $I_R$ is known and therefore also the difference between peak- and average coil current is known. This means that a battery current limit $I_{BAT,MAX}$ can be implemented by adding a peak-to-average compensation current $$\frac{I_R}{2}$$

to the required maximum battery current limit $I_{BAT,MAX}$, and using it as a peak current limit:

$$I_{PEAK,\mathrm{MAX}} = I_{BAT,\mathrm{MAX}} + \frac{I_R}{2} = I_{BAT,\mathrm{MAX}} + \frac{DV_{BAT}}{2L_{BST}f_{BST}};$$

-continued $$D = \frac{V_{BST} - V_{BAT}}{V_{BST}}.$$

In the following, it will be explained how to create the peak-to-average compensation current term:

$$\frac{DV_{BAT}}{2L_{BST}f_{BST}}.$$

Since the required peak-to-average compensation is proportional with the duty cycle D, it can be created using a linear ramp current $I_{P2A}$ on top of the programmed maximum battery current $I_{BAT,MAX}$ in the following way:

$$I_{PEAK,MAX} = I_{BAT,MAX} + I_{P2A}(t).$$

Where the compensation linear ramp current $I_{P2A}$ increases linear with time:

$$I_{P2A}(t) = \frac{V_{BAT}}{2L_{BST}}t.$$

Figure 9A:
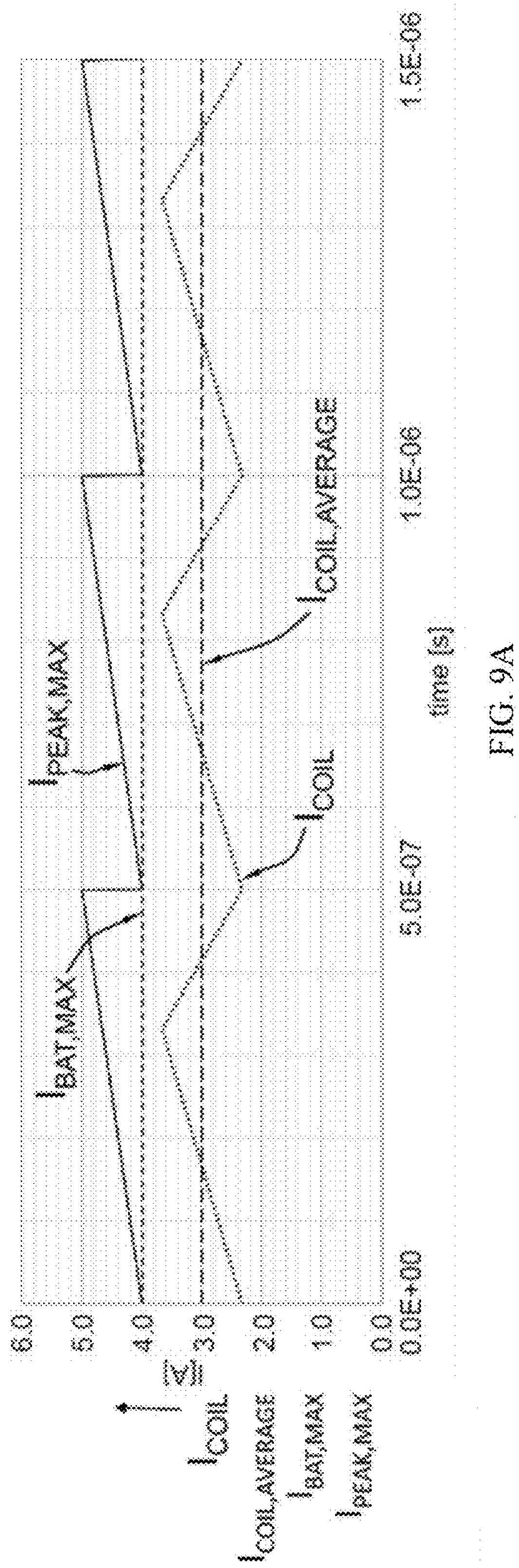
FIGS. 9A-9H show diagrams of the waveforms of several signals of a boost converter according to an embodiment of the disclosure.
Figure 9B:
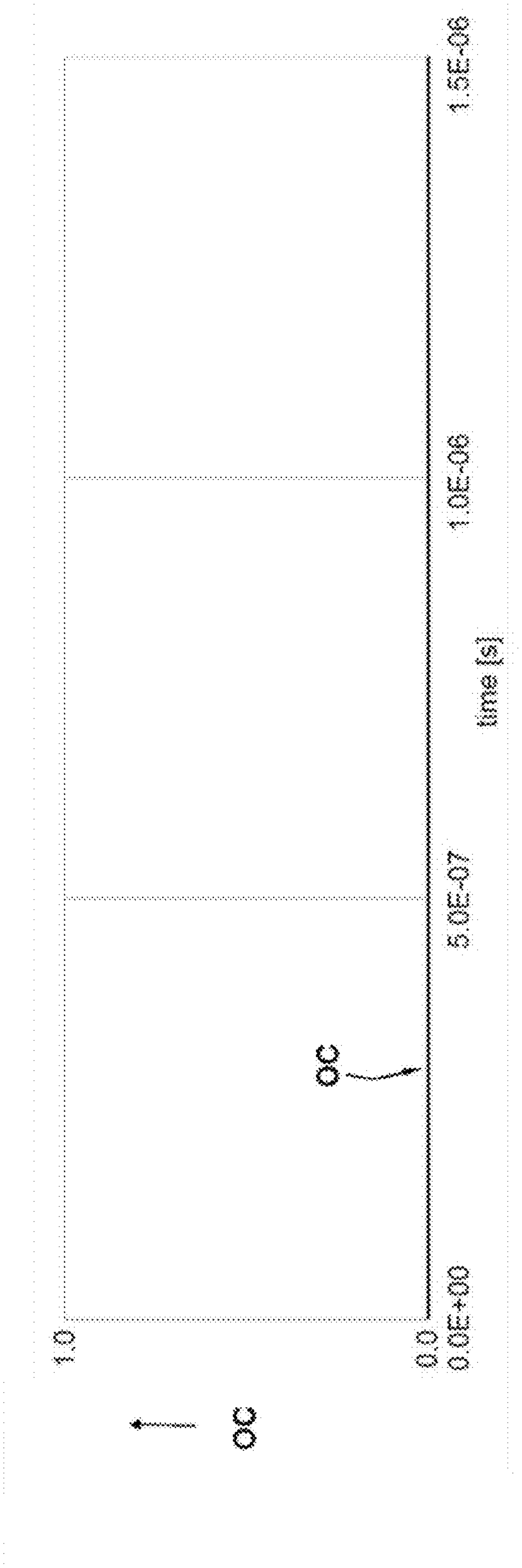
Figure 9C:
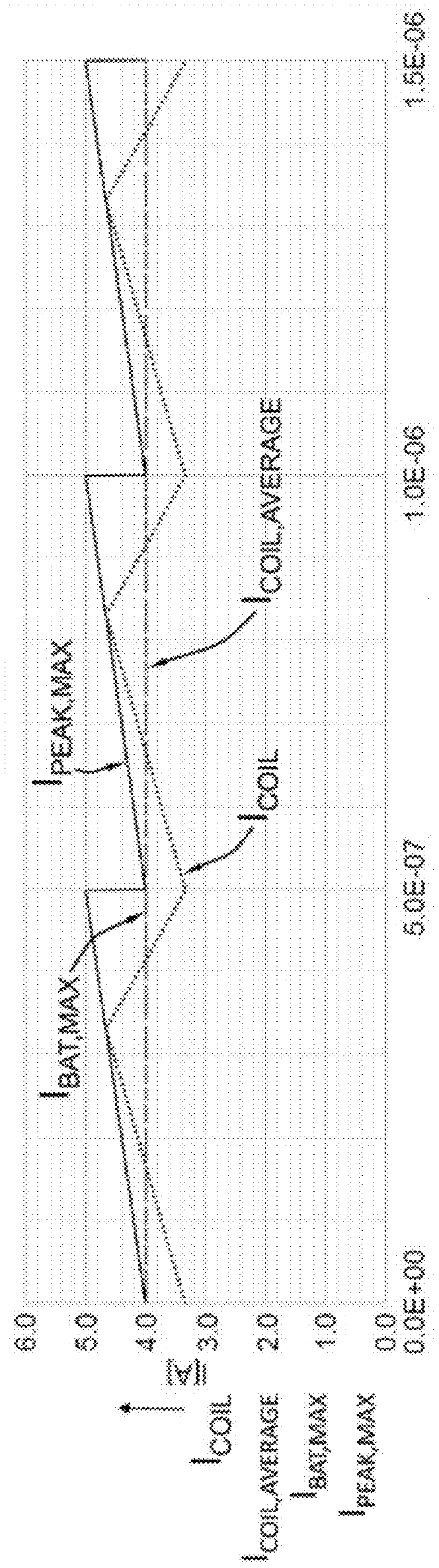
Figure 9D:
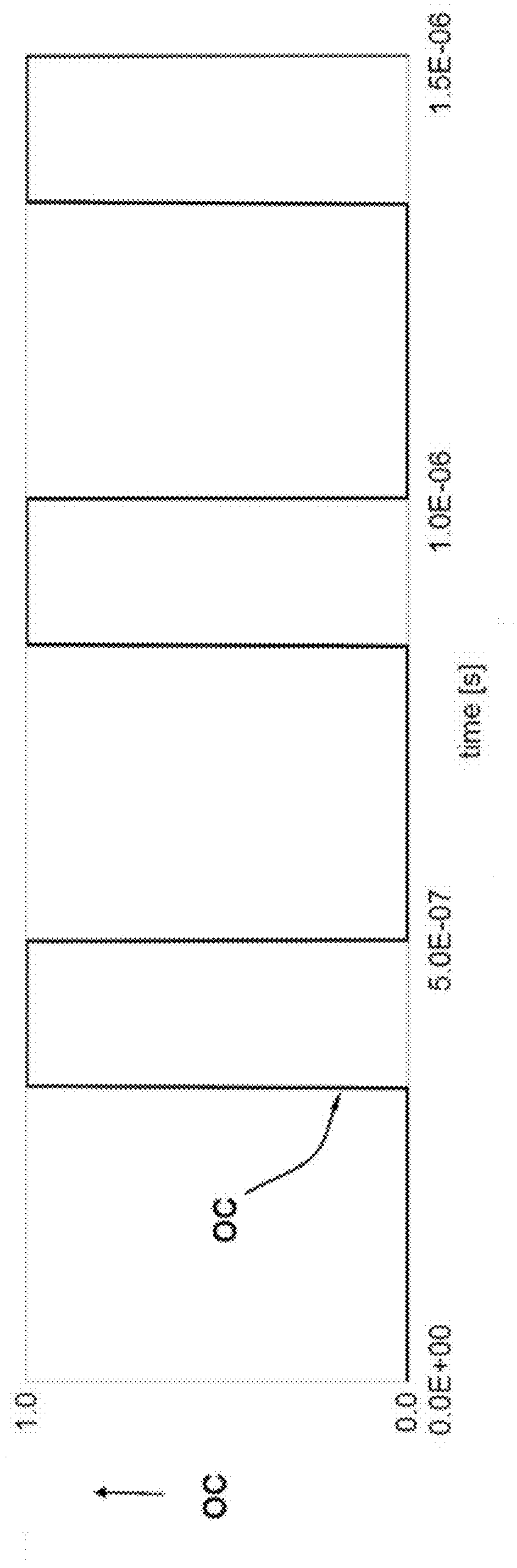
Figure 9E:
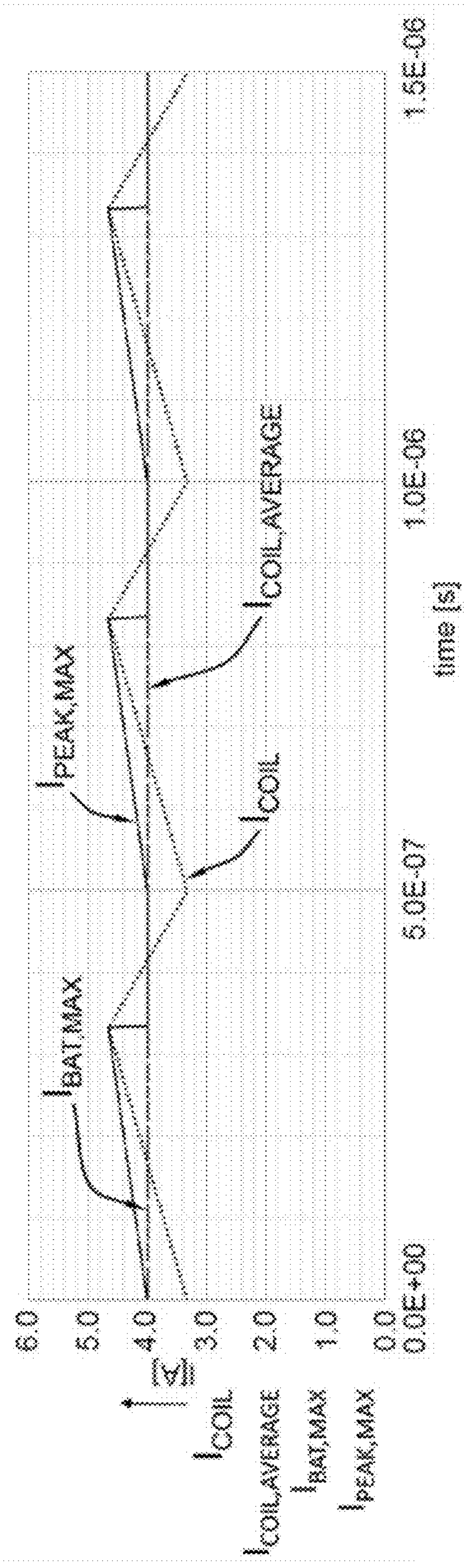
Figure 9F:
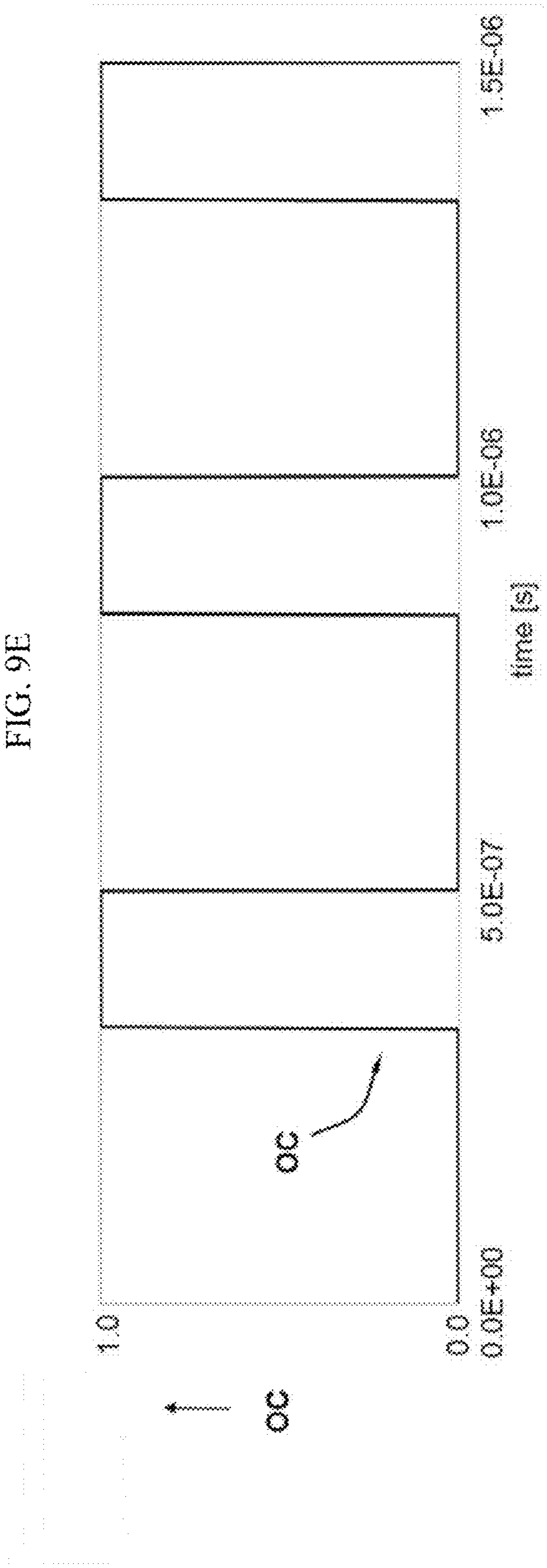
Figure 9G:
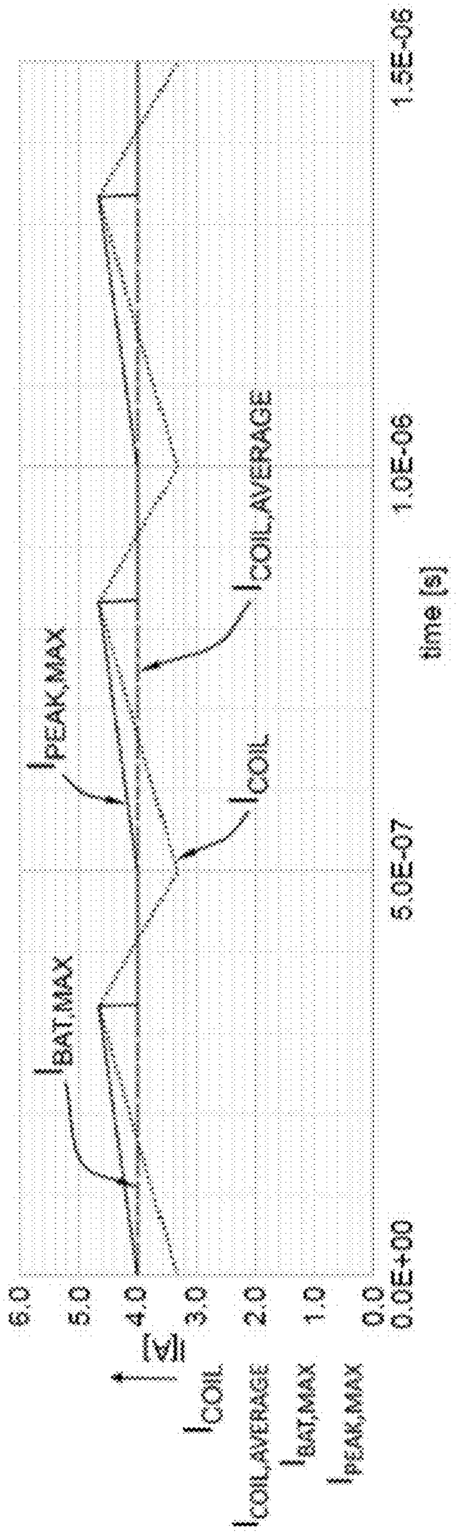

At the moment where the off time is started at t=DT=D/$f_{BST}$, the ripple amplitude will be compensated as shown in FIGS. 9A-9F wherein the average coil current $I_{COIL,AVERAGE}$, the coil current $I_{COIL}$, the peak current limit $I_{PEAK,MAX}$, the maximum battery current $I_{BAT,MAX}$, and the overcurrent oc signal are illustrated, wherein $I_{BAT,MAX}$ and $I_{COIL,AVERAGE}$ are equal in FIGS. 9C, 9E and 9G and therefore overlap. The average coil current $I_{COIL,AVERAGE}$ is then limited to the programmed maximum battery current $I_{BAT,MAX}$ independent of battery voltage or boost voltage.

Figure 9H:
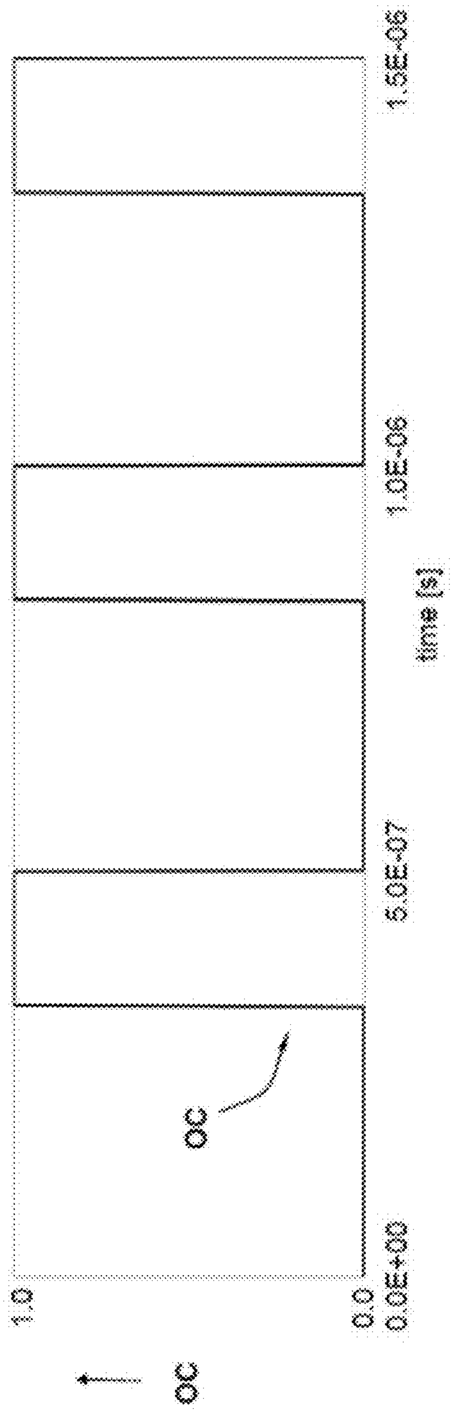

As soon as the pwm signal is activated (pwm=1 here) and the switch $S_L$ is no longer closed, the compensation linear ramp current $I_{P2A}$ can be reset since there it is not required until the next time cycle where the signal pwm is no longer active (pwm=0). This can be seen in FIGS. 9G-9H, where the same situation is presented as in FIGS. 9C-9D but with resetting the compensation linear ramp current $I_{P2A}$ when the signal pwm is high. The simulations shown in FIGS. 9A-9D, and FIGS. 9G-9H have been performed for $V_{BST}$=12V, $V_{BAT}$=4V, L=1 μH and $f_{BST}$=2 MHz. The simulations shown in FIGS. 9E-9F have been performed for $V_{BST}$=6V, $V_{BAT}$=4V, L=1 μH and $f_{BST}$=2 MHz.

Figure 10:
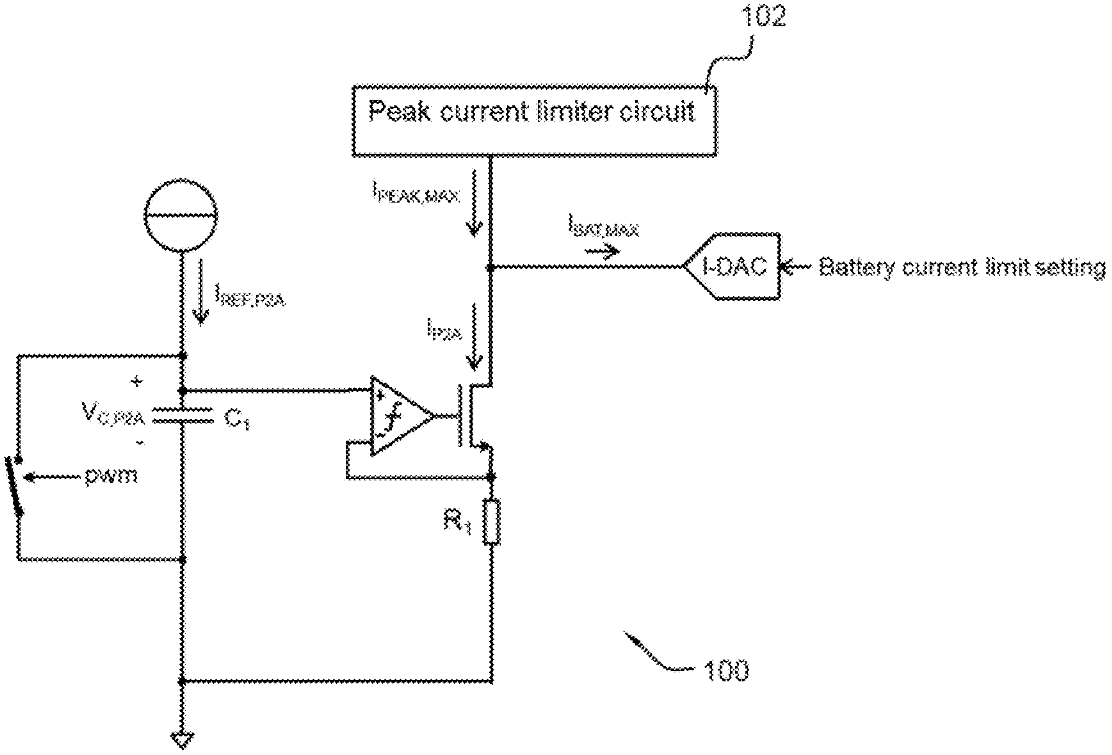
FIG. 10 shows a circuit according to an embodiment of the disclosure.

FIG. 10 shows a possible implementation of a circuit 100 comprising a peak current limiter circuit 102 wherein a reference current $I_{REF,P2A}$ that is proportional with $V_{BAT}$/$L_{BST}$ is charging a capacitor $C_1$ generating a voltage $V_{C,P2A}$ that is linear with time. The signal pwm is used to reset the circuit 100 by discharging the capacitor. The ramping capacitor voltage $V_{C,P2A}$ is converted to a current $I_{P2A}$ and combined with the programmed maximum battery current $I_{BAT,MAX}$ to generate $I_{PEAK,MAX}$ that is be used in the current limiter circuit for the switch $S_L$. The circuit 100 of FIG. 10 also comprises a digital to analog convertor I-DAC configures to receive the battery current limit setting.

Figure 11:
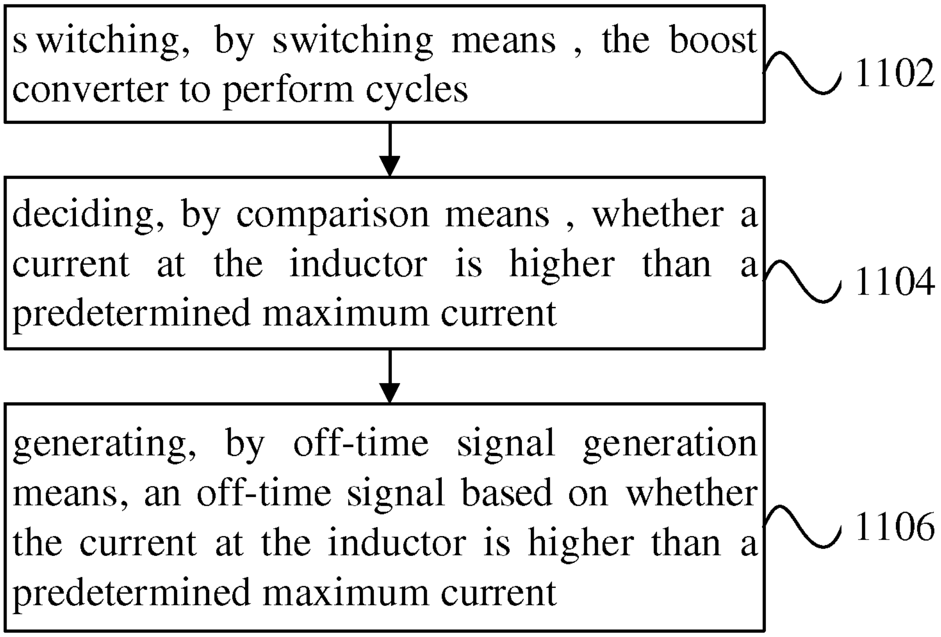
FIG. 11 shows a flowchart of a method of operating a control circuit for a boost converter.

FIG. 11 shows a flowchart of a method of operating a control circuit 100 for a boost converter. The method comprises a step 1102 of switching, by switching means 106, the boost converter to perform cycles wherein each cycle comprises an energy charging state in which an inductor stores energy provided by an input voltage $V_{BAT}$ and an energy discharging state in which the inductor provides energy to an output of the boost converter. Then the method proceeds further to step 1104 which comprises deciding, by comparison means 102, whether a current at the inductor is higher than a predetermined maximum current. Finally, the method goes to step 1106 comprising generating, by off-time signal generation means 104, an off-time signal based on whether the current at the inductor is higher than a predetermined maximum current, wherein the off-time signal determines a duration of a discharging state of a next switching event and wherein the switching means is configured to switch the boost converter based on the generated off-time signal.

The examples and embodiments described herein serve to illustrate rather than limit the disclosure. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

What is claimed is:

1. A control circuit for a boost converter circuit, the control circuit comprising:

- a switching circuit configured to switch the boost converter to perform cycles, wherein each cycle comprises an energy charging state in which an inductor stores energy provided by an input voltage $V_{BAT}$ and an energy discharging state in which the inductor provides energy to an output of the boost converter;
- a comparison circuit configured to decide whether a current at the inductor is higher than a predetermined maximum current; and
- an off-time signal generation circuit configured to generate an off-time signal based on whether the current at the inductor reaches the predetermined maximum current, wherein the off-time signal determines a duration $T_{OFF}$ of the energy discharging state of a next switching event, and wherein the switching circuit is configured to switch the boost converter based on the generated off-time signal;
- wherein the switching circuit switches the boost converter circuit between a first current operation mode and a second voltage operation mode, wherein the off-time signal generation circuit determines the duration of the energy discharging state and an on-time signal generation circuit determines the duration of the energy charging state; and
- when the current at the inductor reaches the predetermined maximum current, the boost converter circuit operates in the first current operation mode, and when the current at the inductor does not reach the predetermined maximum current the boost converter circuit operates in the second voltage operation mode;
- wherein the off-time signal generation circuit comprises a capacitor and a comparison circuit wherein the capacitor is configured to store a voltage $V_{C,OFF}$, wherein the comparison circuit comprises a first input, a second input, wherein the comparison circuit is configured to receive a reference voltage $V_{REF,OFF}$ at the first input, to receive the voltage $V_{C,OFF}$ at the second input, and to generate the off-time signal by comparing the reference voltage $V_{REF,OFF}$ and the voltage $V_{C,OFF}$; and
- wherein the on-time signal generation circuit comprises another capacitor and another comparison circuit wherein the another capacitor is configured to store another voltage $V_{C,ON}$, wherein the another comparison circuit comprises a first input, a second input, wherein the another comparison circuit is configured to receive another reference voltage $V_{REF,ON}$ at the first input, to receive the another voltage $V_{C,ON}$ at the second input, and to generate an on-time signal by comparing the another reference voltage $V_{REF,ON}$ and the another voltage $V_{C,ON}$.

2. The control circuit according to claim 1, wherein in the first current operation mode, the off-time signal generation circuit determines the duration of the energy charging state based on a current at the inductor.

3. The control circuit according to claim 1, wherein in the first current operation mode, a duration $T_{ON}$ of the energy charging state of a next switching event is determined by the duration $T_{OFF}$ of the energy discharging state of a next switching event and a switching frequency $f_{TARGET}$ at which the boost converter performs cycles, wherein $$T_{ON} = \frac{1}{f_{TARGET}} - T_{OFF}.$$

4. The control circuit according to claim 1, wherein in the second voltage operation mode, the on-time signal generation circuit determines the duration of the energy charging state based on a current at the inductor.

5. The control circuit according to claim 1, wherein in the second voltage operation mode, a duration $T'_{OFF}$ of the energy discharging state of a next switching event is determined by the duration $T'_{ON}$ of the energy charging state of a next switching event and a switching frequency $f_{TARGET}$ at which the boost converter performs cycles, wherein $$T'_{OFF} = \frac{1}{f_{target}} = T'_{ON}.$$

6. The control circuit according to claim 1, wherein the comparison circuit is further configured to receive the output voltage of the boost converter circuit, a minimum voltage and to decide whether the output voltage is higher than the minimum voltage; and the on-time signal generation circuit is configured to generate the on-time signal based on whether the output voltage is higher than the minimum voltage.

7. The control circuit according to claim 1, wherein the predetermined maximum current is $$I_{BAT,MAX} + \left(1 - \frac{V_{BAT}}{V_{BST}}\right)\frac{V_{BAT}}{2L_{BST}f_{BST}};$$

$I_{BAT,MAX}$ is a maximum current for a battery connected at the input of the boost converter circuit and an average coil current $I_{COIL,AVERAGE}$ of the inductor is limited to the $I_{BAT,MAX}$, $V_{BST}$ is the output voltage, $V_{BAT}$ is the input voltage, $f_{BST}$ is the switching frequency and $L_{BST}$ is the inductance value of the inductor.

8. The control circuit according to claim 1, wherein the switching circuit is also configured to generate a signal that controls a switch to close such that a voltage $V_{C,OFF}$ across the capacitor increases linearly with time until the first input of the comparator reaches the reference voltage $V_{REF,OFF}$ received at the second input of the comparator.

9. The control circuit according to claim 1, wherein the reference voltage $V_{REF,OFF}$ is equal or proportional to the input voltage of the boost converter circuit $V_{BAT}$, and the capacitor is configured to store a voltage $V_{C,OFF}$ based on the feedback current $I_{CHARGE}$ that is proportional to the output voltage of the boost converter circuit $V_{BST}$.

10. The control circuit according to claim 9, wherein the another reference voltage $V_{REF,ON}$ is generated by a voltage source, and the another reference voltage $V_{REF,ON}$ generated by the voltage source is equal or proportional to $V_{BST}-V_{BAT}$.

11. The control circuit according to claim 9, wherein when the inductor is connected to ground, the boost converter circuit enters into an energy charging state in which current flows through the inductor and the inductor stores some energy by generating a magnetic field; and the current in the inductor increases during said time interval, when the inductor current $I_{COIL}$ reaches the maximum current, an overcurrent signal is activated and the switching circuit sends a control signal to disconnect the inductor from the ground and connect the inductor to the output $V_{BST}$ and the boost converter circuit enters into an energy discharging state.

12. The control circuit according to claim 1, wherein the switching circuit is implemented as a state machine.

13. The control circuit according to claim 12, wherein the state machine comprises eight states and is configured to perform a transition from one of the eight states to another one of the eight states based on whether the current at the inductor reaches the predetermined maximum current.

14. A boost converter circuit comprising:

a control circuit; and an input terminal configured to receive the input voltage $V_{BAT}$, wherein the control circuit comprises:

a switching circuit configured to switch the boost converter to perform cycles, wherein each cycle comprises an energy charging state in which an inductor stores energy provided by an input voltage $V_{BAT}$ and an energy discharging state in which the inductor provides energy to an output of the boost converter;

a comparison circuit configured to decide whether a current at the inductor reaches a predetermined maximum current; and an off-time signal generation circuit configured to generate an off-time signal based on whether the current at the inductor reaches the predetermined maximum current, wherein the off-time signal determines a duration $T_{OFF}$ of the energy discharging state of a next switching event and wherein the switching circuit is configured to switch the boost converter based on the generated off-time signal;

wherein the switching circuit switches the boost converter circuit between a first current operation mode and a second voltage operation mode, wherein the off-time signal generation circuit determines the duration of the energy discharging state and the on-time signal generation circuit determines the duration of the energy charging state; and when the current at the inductor reaches the predetermined maximum current, the boost converter circuit operates in the first current operation mode, and when the current at the inductor does not reach the predetermined maximum current the boost converter circuit operates in the second voltage operation mode;

wherein the off-time signal generation circuit comprises a capacitor and a comparison circuit wherein the capacitor is configured to store a voltage $V_{C,OFF}$, wherein the comparison circuit comprises a first input, a second input, wherein the comparison circuit is configured to receive a reference voltage $V_{REF,OFF}$ at the first input, to receive the voltage $V_{C,OFF}$ at the second input, and to generate the off-time signal by comparing the reference voltage $V_{REF,OFF}$ and the voltage $V_{C,OFF}$; and wherein the on-time signal generation circuit comprises another capacitor and another comparison circuit wherein the another capacitor is configured to store another voltage $V_{C,ON}$, wherein the another comparison circuit comprises a first input, a second input, wherein the another comparison circuit is configured to receive another reference voltage $V_{REF,ON}$ at the first input, to receive the another voltage $V_{C,ON}$ at the second input, and to generate an on-time signal by comparing the another reference voltage $V_{REF,ON}$ and the another voltage $V_{C,ON}$.

15. A method of operating a control circuit for a boost converter, the method comprising:

switching, by switching circuit, the boost converter to perform cycles wherein each cycle comprises an energy charging state in which an inductor stores energy provided by an input voltage $V_{BAT}$ and an energy discharging state in which the inductor provides energy to an output of the boost converter;

deciding, by comparison circuit, whether a current at the inductor reaches a predetermined maximum current; and generating, by off-time signal generation circuit, an off-time signal based on whether the current at the inductor reaches the predetermined maximum current, wherein the off-time signal determines a duration of the energy discharging state of a next switching event and wherein the switching circuit is configured to switch the boost converter based on the generated off-time signal;

wherein the switching circuit switches the boost converter circuit between a first current operation mode and a second voltage operation mode, wherein the off-time signal generation circuit determines the duration of the energy discharging state and an on-time signal generation circuit determines the duration of the energy charging state; and when the current at the inductor reaches the predetermined maximum current, the boost converter circuit operates in the first current operation mode, and when the current at the inductor does not reach the predetermined maximum current the boost converter circuit operates in the second voltage operation mode;

wherein the off-time signal generation circuit comprises a capacitor and a comparison circuit wherein the capacitor is configured to store a voltage $V_{C,OFF}$, wherein the comparison circuit comprises a first input, a second input, wherein the comparison circuit is configured to receive a reference voltage $V_{REF,OFF}$ at the first input, to receive the voltage $V_{C,OFF}$ at the second input, and to generate the off-time signal by comparing the reference voltage and the voltage $V_{C,OFF}$; and wherein the on-time signal generation circuit comprises another capacitor and another comparison circuit wherein the another capacitor is configured to store another voltage $V_{C,ON}$, wherein the another comparison circuit comprises a first input, a second input, wherein the another comparison circuit is configured to receive another reference voltage $V_{REF,ON}$ at the first input, to receive the another voltage $V_{C,ON}$ at the second input, and to generate an on-time signal by comparing the another reference voltage and the another voltage $V_{C,ON}$.

16. The method according to claim 15, wherein in the first current operation mode, the off-time signal generation circuit determines the duration of the energy charging state based on a current at the inductor; and in the second voltage operation mode, the on-time signal generation circuit determines the duration of the energy charging state based on the current at the inductor.

* * * * *